(12) United States Patent
LaQuinta et al.

(10) Patent No.: US 8,751,348 B2
(45) Date of Patent: *Jun. 10, 2014

(54) METHOD, APPARATUS AND ARTICLE-OF-MANUFACTURE FOR MANAGING AND SUPPORTING INITIAL PUBLIC OFFERINGS AND OTHER FINANCIAL ISSUES

(71) Applicant: i-Deal LLC, New York, NY (US)

(72) Inventors: Frank LaQuinta, Morganville, NJ (US); Michael McGinley, Baldwin, NY (US); Michael Ryan, Basking Ridge, NJ (US)

(73) Assignee: I-Deal LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,519

(22) Filed: Apr. 8, 2013

(65) Prior Publication Data

US 2013/0226774 A1 Aug. 29, 2013

Related U.S. Application Data

(63) Continuation of application No. 13/344,174, filed on Jan. 5, 2012, now Pat. No. 8,417,610, which is a continuation of application No. 12/886,102, filed on Sep. 20, 2010, now Pat. No. 8,121,921, which is a continuation of application No. 09/644,013, filed on Aug. 22, 2000, now Pat. No. 7,822,655.

(51) Int. Cl.
  *G06Q 40/00* (2012.01)
(52) U.S. Cl.
  USPC .............................. 705/35; 705/36 R; 705/37
(58) Field of Classification Search
  USPC ........................... 705/35, 36 R, 37
  See application file for complete search history.

(56) References Cited

U.S. PATENT DOCUMENTS 5,008,853 A * 4/1991 Bly et al. ................ 715/751
5,262,942 A * 11/1993 Earle .......................... 705/37

(Continued)

FOREIGN PATENT DOCUMENTS

| GB | 2332604 | 6/1999 |
| JP | 2001216415 | 8/2001 |
| WO | WO 01/33515 | 5/2001 |

OTHER PUBLICATIONS

Institutional Equity Bookbuild, bobsguide 2 pages, available online @http://web.archive.org/liveweb/http://www.bobsguide.com/cgi-bin/guide/prod.pl?ID=bg&assoc=&pcode=5-7939&mode=, last accessed Jul. 17, 2013.*

(Continued)

*Primary Examiner* — Behrang Badii
*Assistant Examiner* — Daniel L Greene
(74) *Attorney, Agent, or Firm* — Eric L. Sophir; Dentons US LLP

(57) ABSTRACT

The present invention relates generally to the field of computer-assisted business methods, and to system and articles-of-manufacture for implementing such methods. More particularly, the invention relates to computer-based methods, apparatus and articles-of-manufacture for supporting the coordination, communication, record-keeping, accounting, security and scheduling needs for the syndicate associated with an initial public offering ("IPO") or other new financial issue. While the invention is exemplified and discussed herein with reference to IPO's, those skilled in the art will appreciate that the present invention is equally applicable to other types of securities and debt instruments, such as preferred stock, corporate bonds, municipal bonds, etc.

21 Claims, 20 Drawing Sheets

(56) References Cited

U.S. PATENT DOCUMENTS

| | | | |
|---|---|---|---|
| 5,550,734 A * | 8/1996 | Tarter et al. ............... 705/2 |
| 5,913,202 A | 6/1999 | Motoyama |
| 5,978,778 A | 11/1999 | O'Shaughnessy |
| 6,029,195 A * | 2/2000 | Herz ............... 725/116 |
| 6,052,785 A | 4/2000 | Lin et al. |
| 6,223,983 B1 | 5/2001 | Kjonaas et al. |
| 6,263,447 B1 | 7/2001 | French et al. |
| 6,601,044 B1 | 7/2003 | Wallman |
| 6,609,115 B1 | 8/2003 | Mehring et al. |
| 6,625,581 B1 | 9/2003 | Perkowski |
| 6,629,082 B1 | 9/2003 | Hambrecht et al. |
| 6,691,094 B1 | 2/2004 | Herschkorn |
| 6,782,369 B1 | 8/2004 | Carrott |
| 6,795,811 B1 | 9/2004 | Epstein |
| 7,346,568 B1 | 3/2008 | Cadoux |
| 2001/0029476 A1 | 10/2001 | Mallenbaum |
| 2001/0034692 A1 | 10/2001 | McRedmond |
| 2002/0010669 A1 | 1/2002 | Street |
| 2002/0016756 A1 | 2/2002 | Rinaldi |
| 2002/0035534 A1 | 3/2002 | Buist et al. |
| 2002/0052816 A1 | 5/2002 | Clenaghan et al. |
| 2003/0088517 A1 | 5/2003 | Medoff |
| 2003/0204473 A1 | 10/2003 | Schulman |

OTHER PUBLICATIONS

"1999: Year of the IPO," CNN Money, Personal Finance Investing, pp. 1-4, Dec. 27, 1999.

Carter, Richard B. et al., "Underwriter Reputation, Initial Returns, and the Long-Run Performance of IPO Stocks," The Journal of Finance, vol. LIII, No. 1, pp. 285-311, Feb. 1998.

Compute, Definition, Webster's Revised Unabridged Dictionary (G & C Merriam Co., 1993), Available @ http://machaut.uchicago.edu/?resource=Webster%27s&word=compute*use1913=on-&use1828=on, Last accessed Mar. 11, 2009.

Computer, Definition, Webster's Revised Unabridged Dictionary (G & C Merriam Co., 1913), Available @ http://ut.uchicago.edu/?action=search&word=computer&resource=Webster%27s&-quicksearch=on, last accessed on Mar. 11, 2009.

Dalton, "How the Stock Market Works," 2.sup.nd Edition, Copyright 1993 by NYTF Corp., ISBN 0-13-097866-3, pp. 33-60, Chapter 3, "The Initial Public Offering".

Decker et al., eCommerce in the fixed income markets, 2003, 63 pages available online @ http://www.jamesgoulding.com/Research_II/Yield%20Curve/Yeild%20Curve%20(Electronic%20Systems%20in%20USA).pdf last accessed Nov. 16, 2012.

European Search Report for European Patent Application No. 03104767.3, dated Oct. 26, 2004.

European Search Report for Application No. 03104767.3-2221, dated Aug. 20, 2004 (mailing date).

Gale, Ian et al., "The Informational Content of Initial Public Offerings," The Journal of Finance, vol. XLIV, No. 2, pp. 469-477, Jun. 1989.

Katz, Jonathan, "Use of Electronic Media for Delivery Purposes," SEC Release No. 33-7233, 34-36345, IC-21399, Available Online @ http://www.sec.gov/rules/interp/33-7233,text, last accessed Mar. 9, 2009.

Utilizing Web Services to Facilitate the New Issue Process, www.i-deal.com, 2002, 13 pages.

i-Deal platform used by Merril Lynch and Citigroup for Halfords IPO, downloaded from finextra.com, 2004, 2 pages.

I-Deal Workflow Solution Available Via Thompson One, Waters News, downloaded from www.watersonline.com/public/showPage.html?page=152664 on May 5, 2009, 4 pages.

Institutional Equity Bookbuild, bobsguide, featured product list, 1 page, 2012.

Tech awards: Equities, Euromoney, 2005, 3 pages.

Dutch State Treasury Agency selects i-Deal system for online bond auction, i-Deal, downloaded from finextra.com, 2005, 2 pages.

* cited by examiner

FIG. 2

METHOD, APPARATUS AND ARTICLE-OF-MANUFACTURE FOR MANAGING AND SUPPORTING INITIAL PUBLIC OFFERINGS AND OTHER FINANCIAL ISSUES

CROSS REFERENCE TO RELATED APPLICATIONS

The present application is a continuation of and claims priority to patent application Ser. No. 13/344,174 entitled "METHOD, APPARATUS AND ARTICLE-OF-MANUFACTURE FOR MANAGING AND SUPPORTING INITIAL PUBLIC OFFERINGS AND OTHER FINANCIAL ISSUES," filed Jan. 5, 2012, which is a continuation of U.S. patent application Ser. No. 12/886,102, entitled "METHOD, APPARATUS AND ARTICLE-OF-MANUFACTURE FOR MANAGING AND SUPPORTING INITIAL PUBLIC OFFERINGS AND OTHER FINANCIAL ISSUES," filed on Sep. 20, 2010, which is a continuation of U.S. patent application Ser. No. 09/644,013, entitled "METHOD, APPARATUS AND ARTICLE-OF-MANUFACTURE FOR MANAGING AND SUPPORTING INITIAL PUBLIC OFFERINGS AND OTHER FINANCIAL ISSUES," filed Aug. 22, 2000, now U.S. Pat. No. 7,822,655, all of which are incorporated herein by reference in their entirety.

FIELD OF THE INVENTION

The present invention relates generally to the field of computer-assisted business methods, and to systems and articles-of-manufacture for implementing such methods. More particularly, the invention relates to computer-based methods, apparatus and articles-of-manufacture for supporting the coordination, communication, record-keeping, marketing, accounting, security and scheduling needs for the various participants (e.g., issuers, underwriters, investors) associated with an initial public offering ("IPO") or other new financial issues. While the invention is exemplified and discussed herein with reference to IPO's, those skilled in the art will appreciate that the present invention is equally applicable to other types of public and private offerings of equity and equity-linked securities, including debt instruments, such as preferred stock, corporate bonds, municipal bonds, etc.

BACKGROUND OF THE INVENTION

Generally speaking, the process of underwriting (or bringing an issue to market) begins with the decision of what type of offering the issuing company needs. Typically, the company would consult with an investment bank regarding how the offering should be structured and distributed.

Securities offerings can be generally classified into two groups: (i) new issues (i.e., IPO's from companies first going public) and (ii) additional issues (i.e., additional issues from companies that have already gone public). Additionally, public offerings can be further classified as: (i) primary offerings (with proceeds going to the issuing company); (ii) secondary offerings (with proceeds going to a major stockholder, who is selling all or part of his/her shares); (iii) split offerings (i.e., a combination of primary and secondary); or (iv) shelf offerings (i.e., an offering under SEC Rule 415, which allows the issuer to sell additional securities over a two-year period to raise funds as needed).

Once the structure of an issue is decided, the next step in the underwriting process is generally to form the "syndicate" and, if needed, a "selling group." Because most new issues are too large for one underwriter to handle, a "managing underwriter" (or "bookrunning manager") often invites other investment bankers to participate in a joint distribution of the offering. This group is known as "the syndicate"; and the managing (or lead) underwriter is known as the "syndicate manager" (or "bookrunning manager"). Each member of the syndicate usually makes a firm commitment to distribute a given percentage of the entire offering, and he/she is held financially responsible for any unsold portion of his/her allocation. "Selling groups" (i.e., groups of chosen brokerages) are often formed to assist the syndicate members in meeting their obligations to distribute the securities. Members of the selling group usually act on a "best efforts" basis, and are not financially responsible for unsold shares.

Generally speaking, it is the job of the syndicate manager to "prove the market" for the issue; typically, the manager (sometimes with the assistance of co-manager(s), etc.) coordinates a series of meetings and presentations (a "roadshow") to explain to potential investors that the proposed issue represents a good investment at its proposed price (or, in the case of an IPO, price range). Under the most common type of underwriting, the syndicate manager makes a commitment to the issuing corporation to purchase all shares being offered. If part of the new issue goes unsold, any losses are distributed among the members of the syndicate.

Testing the market's receptiveness to a new issue is done by gathering "indications of interest." An indication of interest ("IOI") does not legally obligate the party expressing interest to actually purchase the issue when it becomes available, since such sales are prohibited until the security has cleared registration with the Securities and Exchange Commission.

When new shares are issued, there is a "spread" between what the underwriters buy the stock from the issuing corporation for and the price at which the shares are offered to the public (the "Public Offering Price" or "POP"). The spread is traditionally allocated as follows:

a Manager's Fee (typically, 10-20% of the spread) goes to the managing underwriter for negotiating and managing the offering;

an Underwriting Fee (typically, 20-30% of the spread) goes to the managing underwriter and syndicate members for assuming the risk of buying the securities from the issuing corporation; and, a Selling Concession (typically, 50-60% of the spread) goes to the managing underwriter, the syndicate members, and to selling group members for placing the securities with investors.

Traditionally, new issues were targeted largely—if not exclusively—to institutional investors, e.g., mutual funds, pension funds, investment managers, hedge funds, etc. However, recent trends, such as the widespread media coverage that many new issues receive, have created significant—and presently unmet—demand for access to the new issue marketplace among individual investors who buy and sell their own shares ("retail investors"). A typical retail investor may buy 100-1000 shares of an offering.

Bringing a new deal to market is a complicated, time-consuming process that demands significant communication and cooperation between numerous members of a multi-disciplinary team. As shown in FIG. 1, the process typically begins with an investment banker ("IBK") 10, who meets with the client (and potential issuer) to determine how to best raise capital to meet the client's needs. The banker's responsibility includes managing the relationship with his/her client before, during and after a transaction. The banker typically is—and remains—the client's direct contact during the entire process.

An Equity Capital Markets ("ECM") group is typically responsible for pitching, marketing and pricing a transaction. Requiring heavy interaction with other in-house disciplines/ departments (e.g., banking, sales, research) as well as the greater investment community (e.g., "the street"), ECM can be considered as the nucleus of a transaction or deal. Unlike the sales and banking functions, the capital markets group has the tough role of satisfying two clients—the issuer and the investor(s)—with fundamentally opposite interests. (I.e., an issuer wants to sell at the highest price possible, while an investor wants to buy at the lowest price possible). ECM's job is to figure out the right price, while managing expectations of both opposing parties.

An institutional sales department ("ICD") is responsible for knowing which of its institutional investors will have interest in a particular new issue and providing the potentially-interested investors with all the details and marketing the offering. Once an investor has been informed, the institutional salesperson relays the investor's feedback to ECM.

Beyond this group of in-house disciplines/departments is the syndicate, which, as previously noted, includes a group of broker/dealers, each of which have agreed to underwrite a certain percentage of the offering. Each member's percentage is determined by the member's "underwriting bracket." Typically, the brackets are allocated as follows:

Manage—also referred to as Lead Manager, this is the highest bracket, with the largest percentage in the group;
Co-Manage—also referred to as Co-Lead Manager or Joint Lead Manager, this is the only role that can be shared in the same bracketing as the Lead-Manager, or can have a separate bracket of its own;
Major—also referred to as underwriters; and,
Sub-Major—also referred to as underwriters.

Returning to FIG. 1 in the next step 20 of the process, the investment bankers consider market conditions, consult with other in-house departments (such as institutional sales, ECM, etc.), and devise a recommended issuance strategy for the client. After securing approval 30 from the client, the deal is passed to the ECM group for marketing/realization. The syndicate marketers then "circle" 40, pitching the deal to potential investors and soliciting indications of interest. Once the deal closes, the net proceeds 50 are distributed to the client and the underwriting, management and selling concession fees 60 are retained by members of the syndicate and the selling group. The overall process can take anywhere from months to years to complete.

OBJECTS AND SUMMARY OF THE INVENTION

Efficient management and coordination of the new issue process demands that various players have access to up-to-date information concerning various aspects of the project. Deal Manager ("DM") is computer-implemented system, used by the assignee, to coordinate the marketing and operational activities involved in primary and secondary public and private offerings of equity, debt and equity-linked products, such as bonds. DM collects multi-currency, multi-product, multi-priced orders from institutions and other syndicate members, displays the order book in any currency or product, sorts and summarizes the book in a drill down display by any criteria, allocates orders in any products, generates graphical analysis of orders, allocations and prices, and stores deals for historical view.

DM is implemented using a two-tier architecture (i.e., (Visual C++ and Visual Basic)/Oracle) and supports 150 users in seven countries. DM provides:

(1) a single, global repository for all debt and equity syndicate information;
(2) a multi-currency, multi-product, multi-tranche, Dutch auction;
(3) information on filings (both public and private);
(4) a calendar of future offerings;
(5) a database of customer indications (from the sales department);
(6) a database of customer allocations (from the syndicate sales desk);
(7) records of each syndicate member's participation;
(8) links to wire services, for communication to participating brokers;
(9) links to traders;
(10) information concerning deal economics (management and pot);
(11) a database of customer designations;
(12) information concerning final settlements of revenues and expenses; and,
(13) historical reporting capabilities.

Also in use by the assignee is a related system, the Roadshow system, which tracks the marketing of syndicate new issues, issuer non-deal roadshows and analyst roadshows, and presents this information in a calendar format. The Roadshow system contains all significant information pertaining to the roadshows and the underlying deals, such as pricing/filing dates, conference calls, one-on-one meetings, group functions and holidays. It captures a variety of information, including meeting dates, times, locations, attendees from the issuers, investors and the syndicate manager. It also keeps profiles of institutions and their holdings. It facilitates effective marketing of new equity and debt issues, and coordinates their marketing with that of other corporate functions, such as sales, research and special events. It allows for each of the various types of users to enter the information for which they are responsible—e.g., the syndicate desk enters the overall schedule, the regional sales offices can enter their meeting details, and the bankers can maintain the list of bankers and company management who attend the meetings. All of this information is available to users in real-time, with appropriate restrictions on accessibility of certain information. Roadshow is implemented using a 3-tier architecture (Visual C++/ Entera/Oracle) and supports 800 users in 15 countries. An exemplary Roadshow screen shot appears in FIG. 2.

While DM and Roadshow provide powerful tools to facilitate the efficient management of the new issue process, they are not well-suited for use by players outside the organization of the syndicate manager. Thus, there remains a significant— but presently unmet—need for computer-based methods, apparatus and articles-of-manufacture for supporting the coordination, communication, record-keeping, accounting, security and scheduling needs of multi-organizational syndicates associated with IPO's and other new financial issues. Furthermore, there also remains a significant—but presently unsatisfied—need for computer-based methods, apparatus and articles-of-manufacture for allowing retail investor(s) to participate directly in the IPO (and other new issue) process.

Accordingly, one object the invention relates to a system that provides DM/Roadshow-like functionality, but is accessible to, and usable by, a wider audience.

Another object of the invention relates to a system/method that facilitates/permits the delivery of capabilities associated with a financial services company's in-house "new issues group" directly to the company's clients, syndicate members, issuers, and other in-house departments, such as sales.

Another object of the invention relates to a system/method to facilitate/permit expansion of traditional, in-house sales and marketing functions through use of inter/intranet technology to provide information of upcoming syndications and provide a mechanism though which a variety of parties (e.g. customers, sales personnel, institutional investors, retail investors, etc.) can express interest in upcoming deals.

A still further object of the invention relates to systems/methods to provide/facilitate one or more of the aforesaid processing capabilities for common stock offerings (e.g., ordinary shares ("ORD"), American Depository Receipts ("ADR's"), Global Depository Receipts ("GDR's") and common stock), convertible offerings (e.g., bonds and preferred stock offerings) and derivative product offerings.

One or more of the aforementioned objects (as well as other objects) are realized, at least in part, by the present invention, the various aspects of which are described below.

Accordingly, generally speaking, and without intending to be limiting, one aspect of the invention relates to a computer-implemented method for marketing a new financial issue, comprising: storing, in a central database associated with an underwriter of said new issue, information concerning said new issue, said stored information including indication(s)-of-interest in said new issue; linking said central database to a communication network, such that members of a syndicate may access selected portions of said database via said communication network; and regulating access to said central database by selectively assigning permissions to said members of said syndicate. Storing may comprise entering an initial indication-of-interest into said central database, modifying a previously-entered indication-of-interest stored in said central database, and/or deleting a previously-entered indication-of-interest stored in said central database. Storing may also comprise writing proposed update(s) to a temporary storage medium, then, after review of said proposed update(s), writing said update(s) to said central database; and storing may further comprise electronically notifying the members of said syndicate when changes, involving indication(s)-of-interest, are entered into said central database, said syndicate preferably including at least one manager, at least one issuer, and a plurality of investors. Linking may include connecting to the internet and/or to a corporate intranet. Regulating access may further comprise assigning permissions such that issuer(s) and underwriter(s) have less restricted access to said central database than investor(s), and/or checking permission(s) prior to providing access to said central database and providing access only as permitted by said checked permission(s).

Again, generally speaking, and without intending to be limiting, another aspect of the invention relates to a computer-implemented method for managing and distributing information among members of a new issue syndicate, said syndicate including an issuer, at least one manager and a plurality of institutional investors, said method comprising: storing information concerning said new issue in a computer-readable database controlled by said at least one manager; receiving, via an electronic communication link, requests to update said information stored in said computer-readable database, said requests to update including requests to add, change or delete indication(s)-of-interest in said new issue; and responding to said requests to update by selectively updating said computer-readable database, as directed by said at least one manager. Preferably, said at least one manager controls said computer-readable database by assigning permission(s) for other(s) who seek to access said database. Said communication link may include at least one Internet segment and/or at least one corporate intranet segment. Said requests to update may be received from an institutional investor and/or a salesperson affiliated with said at least one manager. Selectively updating may comprise writing proposed update(s) to a temporary storage medium, then, after review of said proposed update(s) by said at least one manager, writing said update(s) to said computer-readable database.

Again, generally speaking, and without intending to be limiting, another aspect of the invention relates to a computer-implemented method for marketing a new issue to a group of potential investors, said group including institutional investors and retail investors, said method comprising: storing, in a computer-readable database associated with an underwriter of said new issue, information, including a prospectus and indication(s)-of-interest, concerning said new issue; linking said computer-readable database to a communication network; receiving first indication(s)-of-interest from one or more of said institutional investors, via said communication network, and storing said first indication(s)-of-interest in said computer-readable database; and receiving second indication(s)-of-interest from one or more of said retail investors, via said communication network, and storing said second indication(s)-of-interest in said computer-readable database, each of said second indication(s)-of-interest having at least one clearing broker and/or dealer associated therewith. Said communication network may include at least one internet segment and/or at least one corporate intranet segment. Said computer-implemented method may further include refusing to store indication(s)-of-interest, received from retail investors, which do not have a clearing broker and/or dealer associated therewith. Said first and second indication(s)-of-interest may be received in any order.

Again, generally speaking, and without intending to be limiting, another aspect of the invention relates to a computer-based apparatus for marketing a new financial issue, comprising: a central database associated with an underwriter of said new issue, said database containing information concerning said new issue, including indication(s)-of-interest in said new issue; a communication network, connected to said central database, such that members of a syndicate may access selected portions of said database via said communication network; and means for regulating access to said central database by selectively assigning permissions to said members of said syndicate. The information contained in said central database may include at least one initial indication-of-interest and/or at least one previously-entered, and subsequently modified, indication-of-interest. The apparatus may further comprise means for writing proposed update(s) to a temporary storage medium, then, after review of said proposed update(s), writing said update(s) to said central database, and/or means for electronically notifying the members of said syndicate when changes, involving indication(s)-of-interest, are entered into said central database, wherein said syndicate preferably includes at least one manager, at least one issuer and a plurality of institutional investors. Said communication network may include at least one internet segment and/or at least one corporate intranet segment. Said means for regulating access may further comprise means for assigning permissions such that issuer(s) and underwriter(s) have less restricted access to said central database than institutional investor(s), and/or means for checking permission(s) prior to providing access to said central database and for providing access only as permitted by said checked permission(s).

Again, generally speaking, and without intending to be limiting, another aspect of the invention relates to a computer-based apparatus for managing and distributing information among members of a new issue syndicate, said syndicate including an issuer, at least one manager and a plurality of institutional investors, said apparatus comprising: a computer-readable database, controlled by said at least one manager, said computer-readable database containing indication(s)-of-interest in said new issue; means for receiving, via an electronic communication link, requests to update said information stored in said computer-readable database, said requests to update including requests to add, change or delete indication(s)-of-interest in said new issue; and means for responding to said requests to update by selectively updating said computer-readable database, as directed by said at least one manager. Said apparatus may further include means for allowing at least one manager to control said computer-readable database by assigning permission(s) for other(s) who seek to access said database. Said communication link may include at least one Internet segment and/or at least one corporate intranet segment. Said requests to update may be received from an institutional investor and/or a salesperson affiliated with said at least one manager. Said apparatus may further include means for writing proposed update(s) to a temporary storage medium, then, after review of said proposed update(s) by said at least one manager, writing said update(s) to said computer-readable database.

Again, generally speaking, and without intending to be limiting, another aspect of the invention relates to a computer-based apparatus for marketing a new issue to a group of potential investors, said group including institutional investors and retail investors, said apparatus comprising: means, associated with an underwriter of said new issue, for storing, in a computer-readable database, information, including indication(s)-of-interest, concerning said new issue; a communication network, linked to said computer-readable database; means for receiving first indication(s)-of-interest from one or more of said institutional investors, via said communication network, and for storing said first indication(s)-of-interest in said computer-readable database; and means for receiving second indication(s)-of-interest from one or more of said retail investors, via said communication network, and for storing said second indication(s)-of-interest in said computer-readable database, each of said second indication(s)-of-interest having at least one clearing broker and/or dealer associated therewith. Said communication network may include at least one internet segment and/or at least one corporate intranet segment. Said apparatus may further include means for refusing to store indication(s)-of-interest, received from retail investors, which do not have a clearing broker and/or dealer associated therewith. Said first and second indication(s)-of-interest may be received in any order.

Again, generally speaking, and without intending to be limiting, another aspect of the invention relates to an article-of-manufacture for use with a computer, said article-of-manufacture comprising a computer-readable medium containing a plurality of instructions, including instructions which, when executed, cause said computer to: store, in a central database associated with an underwriter of a new issue, information concerning said new issue, including indication(s)-of-interest in said new issue; link said central database to a communication network, such that members of a syndicate may access selected portions of said database via said communication network; and regulate access to said central database by selectively assigning permissions to said members of said syndicate.

Again, generally speaking, and without intending to be limiting, another aspect of the invention relates to an article-of-manufacture for use with a computer, said article-of-manufacture comprising a computer-readable medium containing a plurality of instructions, including instructions which, when executed, cause said computer to: store information concerning a new issue in a computer-readable database controlled by a manager; receive, from institutional investors via an electronic communication link, requests to update said information stored in said computer-readable database, said requests to update including requests to add, change or delete indication(s)-of-interest in said new issue; and respond to said requests to update by selectively updating said computer-readable database, as directed by said manager.

Again, generally speaking, and without intending to be limiting, a final aspect of the invention relates to an article-of-manufacture for use with a computer, said article-of-manufacture comprising a computer-readable medium containing a plurality of instructions, including instructions which, when executed, cause said computer to: store, in a computer-readable database associated with an underwriter of a new issue, information, including indication(s)-of-interest, concerning said new issue; link said computer-readable database to a communication network; receive first indication(s)-of-interest from one or more institutional investors, via said communication network, and store said first indication(s)-of-interest in said computer-readable database; and receive second indication(s)-of-interest from one or more retail investors, via said communication network, and store said second indication(s)-of-interest in said computer-readable database, each of said second indication(s)-of-interest having at least one clearing broker and/or dealer associated therewith.

Still further aspects of the invention relate to alternative or supplemental combinations, or sub-combinations, of the above-described structures, elements, steps and/or articles-of-manufacture consistent with, and/or in furtherance of, the objects and advantages of the invention herein.

BRIEF DESCRIPTION OF THE DRAWINGS

Certain aspects of the present invention are depicted in the accompanying drawings, which are intended to be considered in conjunction with the detailed description below, and which are intended to be illustrative rather than limiting, and, in which:

FIG. 2 is an exemplary screen shot from the assignee's Roadshow system;

DETAILED DESCRIPTION OF THE PREFERRED EMBODIMENT(S)

Certain aspects of the invention are exemplified herein by reference to a presently preferred embodiment, known as the "i-Deal" system. While certain aspects of the present invention may be illustrated herein with reference to IPO's, it is expressly understood that the invention applies equally to a wide variety of offerings, such as common stock offerings, convertible offerings, and derivative product offerings. Moreover, offerings of non-US issuers often include multiple tranches of securities—and those skilled in the art will appreciate that the invention may be adapted to service such offerings. Thus, although many different classifications of new issues exist (for example, the group of "convertibles" includes Zero Coupon bonds, perpetual and stated maturity bonds, bonds with special tax treatments, etc.), the basic requirements for processing customer indications remain largely the same.

Institutional customers, research sales personnel on behalf of institutional customers, syndicate members, in-house syndicate personnel and retail "E-tranche" brokers, on behalf of their customers, may all use the i-Deal application.

Preferably, all approved clients are provided with the capability of selecting an issue from a list of upcoming deals. The list includes both managed and co-managed deals, and preferably sorts based on expected date of the offerings. The list displays the name of the issuer, the size of the issue, company symbol, expected date of the deal, type of offering and price talk (file range for IPO's and last sale for secondary offerings). Add, modify, cancel and delete procedures are provided. Additionally, reporting on prior indications and allocations is provided.

The communication between the client (institutional customer, sales for the institutional customer, syndicate member or in-house syndicate personnel) and the syndicate desk ("ECM") is controlled by use of a pending queue mechanism. Immediate acknowledgment of delivery of an IOI to the syndicate desk is communicated, as a result of the successful completion of the entry. A second acknowledgment is sent to the client based upon the acceptance of the IOI by the syndicate coordinator. Preferably, the syndicate desk coordinator must take an action that moves the "pending order" into the "official book." This action will communicate to the end-client an acknowledgment that the IOI has been accepted, either in whole or in part.

I-Deal provides each II with the capability to view IOI's/Allocations, and to search, sort and filter:

By Deal;
By IOI/Allocation;
By the II's Customer Name/Account;
By IOI Type; and/or,
By IOI Status.

Figure 1:
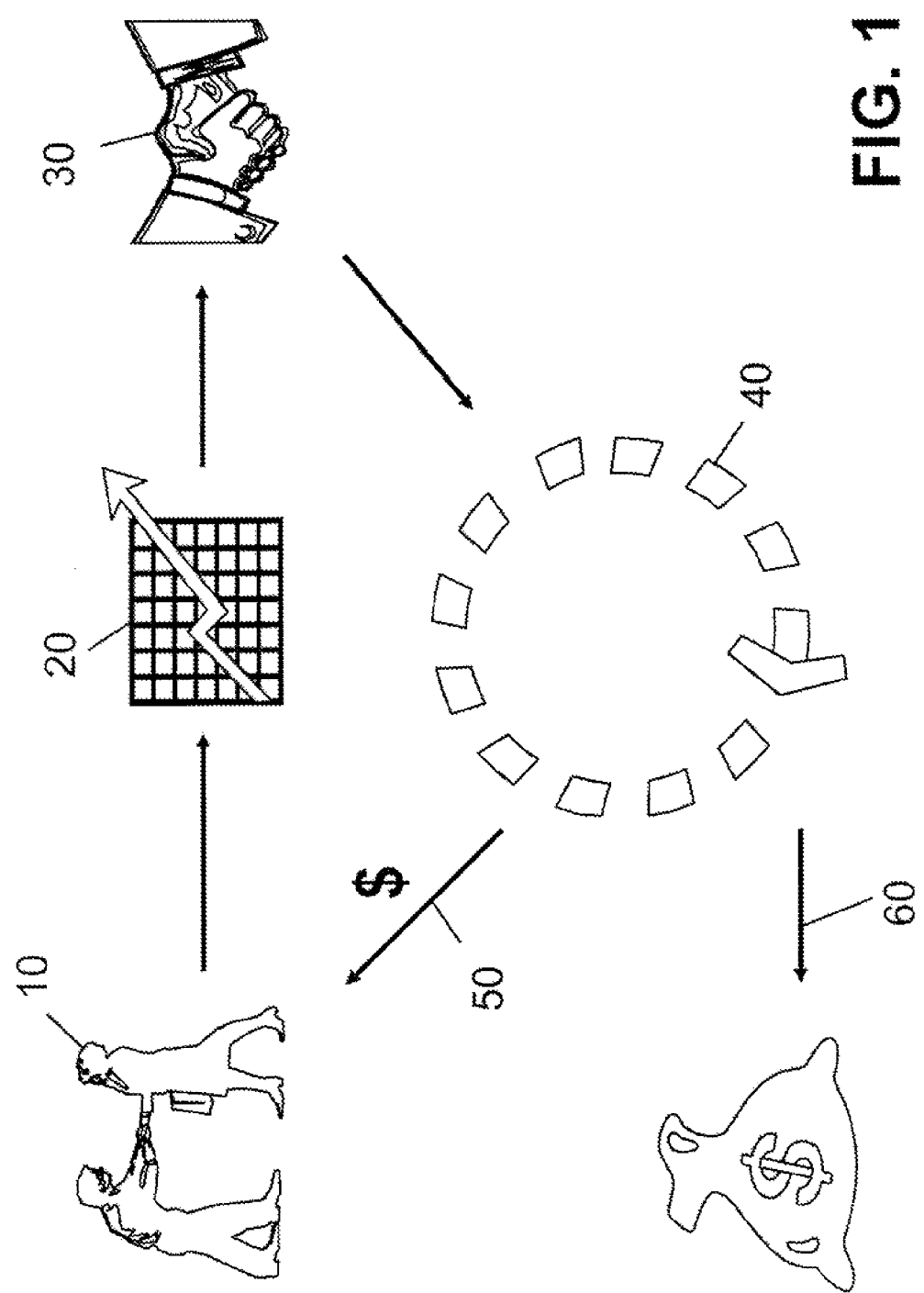
FIG. 1 exemplifies the traditional process of creating and selling a new issue.
Figure 3:
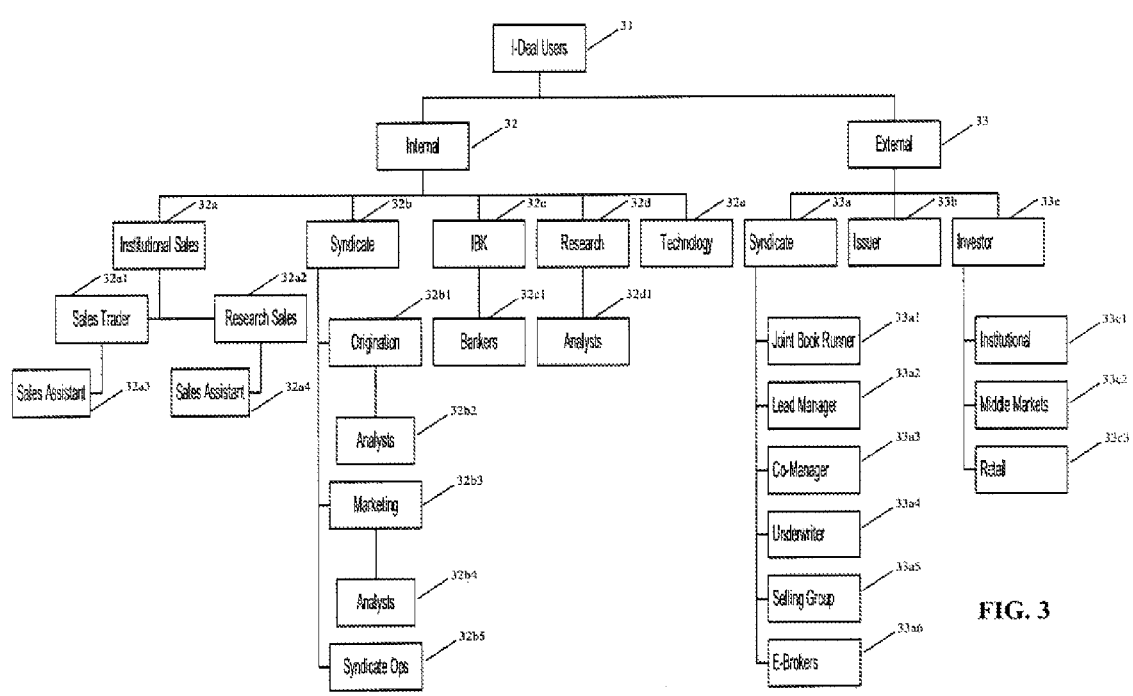
FIG. 3 is a chart depicting the various users of the i-Deal system.

Reference is now made to FIG. 3, which depicts the community 31 of in-house 32 and external 33 i-Deal users. In-house, or internal, users 32 include an institutional sales department 32a, an internal syndicate group 32b, an in-house investment banking group 32c, an in-house research group 32d and an in-house technology group 32e. Within institutional sales 32a, both a sales trader 32a1 and research sales 32a2, as well as their respective sales assistants 32a3/32a4, may use the i-Deal system. Likewise, within the syndicate group 32b, i-Deal users may be found within origination 32b1, marketing 32b3 and operations 32b5, as well as various supporting analysts 32b2/32b4. External users 33 include the syndicate 33a, issuer 33b and investors 33c. External syndicate 33a users may include a joint book runner 33a1, a lead manager 33a2, a co-manager 33a3, an underwriter 33a4, a selling group 33a5 and E-brokers 33a6. Investor users 33c of the i-Deal system may include institutional investors 33c1, middle market investors 33c2 and retail investors 33c3.

The time frame for the marketing of each deal varies based upon market conditions and the client need for the proceeds of an issue. An indicator (switch) is set at the tranche level to start and stop the indication process for each offering. Access to the indication entry process is restricted at all times except during the active period.

The following background discussion is intended to facilitate the reader's understanding of the present invention.

Indications of Interest:

An indication of interest can be described as a desire to enter an order to purchase a security at a stated price (limit) or at the established price of the offering (market). This indication can be expressed in security amounts (e.g., number of shares) or currency amounts (e.g., up to $2,00,000 of amount issued)

Coverage Team ("CT"):

The group of in-house sales people who participate in facilitating the given client's business needs.

Sales or Salesforce:

May Refer to both the Sales Trader and/or Research Sales (in an Equity Model), who maintain a relationship with the Institutional Investor and the Syndicate Marketer.

Relationship Manager ("RM"):

The in-house sales person who is responsible for overall account management (by product type) for a given customer. The RM is the point person on the Coverage Team.

Syndicate Marketing ("ECM"):

Generically refers to the equity syndicate marketer who is running a given deal.

Syndicate Member:

A Broker/Dealer who participates in a given deal. His/her role may be manager, co-manager, underwriter or member of the selling group.

Selling Group:

A Broker/Dealer or Buy Side firm which distributes the offering and receives a selling concession for their efforts. The selling group members are compensated on the number of shares sold.

Designation:

The Allocation which is "designated for credit" by the Institutional client back to a Syndicate Member, usually along Pot Split lines.

Exercised Greeenshoe Amount:

Greenshoe can be exercised, in whole or in part, up to maximum Greenshoe Size. Exercised Greenshoe Amount is the total Exercised at any point in time.

File Size:

The amount filed w/ the SEC (same as Launch Size for international deals).

Hard Pot:

A U.S.-style deal, where IOIs are communicated through the lead manager. Only one II is permitted per deal (tranche).

Greenshoe Size:

The amount set aside by the issuer for filling over-allotments. Typically, 15% of the Issue size.

Institutional Pot:

The number of Shares (Bonds/Units) allocated for Institutional Investor orders.

Institutional Retention:

The number of Shares (Bonds/Units) allocated to the syndicate-managing organization for its own institutional clients.

Issue Size:

The number of Shares (Bonds/Units) to be underwritten for the issue. This is size printed on the FINAL prospectus.

Issue Size w/ Greenshoe:

The sum of the Issue Size and the Exercised Greenshoe Amount.

Retail Retention:

The number of Shares (Bonds/Units) allocated for distribution through the syndicate-managing organization's Retail channel.

Revised File Size:

Some size changes require re-filing with the SEC.

Soft Pot:

A Euro-style deal, where IOI's can be communicated and attributed to all syndicate members. One-to-many IOI's are permitted per deal (tranche), per customer. However, only one (max) may be attributed to a given syndicate member, in a given deal (tranche).

Street Retention:

The number of Shares (Bonds/Units) allocated to syndicate members for distribution to their institutional and/or retail customers.

Tranche:

A sub-structure of the overall deal. Typically, tranches are broken out by geographical regions, product types or special situations (e.g., an employee tranche).

Tranche Size:

The number of Shares (Bonds/Units) underwritten for a given tranche.

Underwriters:

Members of the Syndicate who have a liability to the issuer for the purchase of a percentage of the overall deal (tranche).

Aspects of the present invention will next be described by reference to various illustrative examples, presented by means of a "use case" approach. These examples are intended to exemplify the business process flows and requirements (by role and associated functionality) in the i-Deal system. These use cases are organized into "swim lanes," with each lane representing a relevant player in the depicted process. Each process type, in a given lane, is a specific action in the overall workflow.

Figure 4:
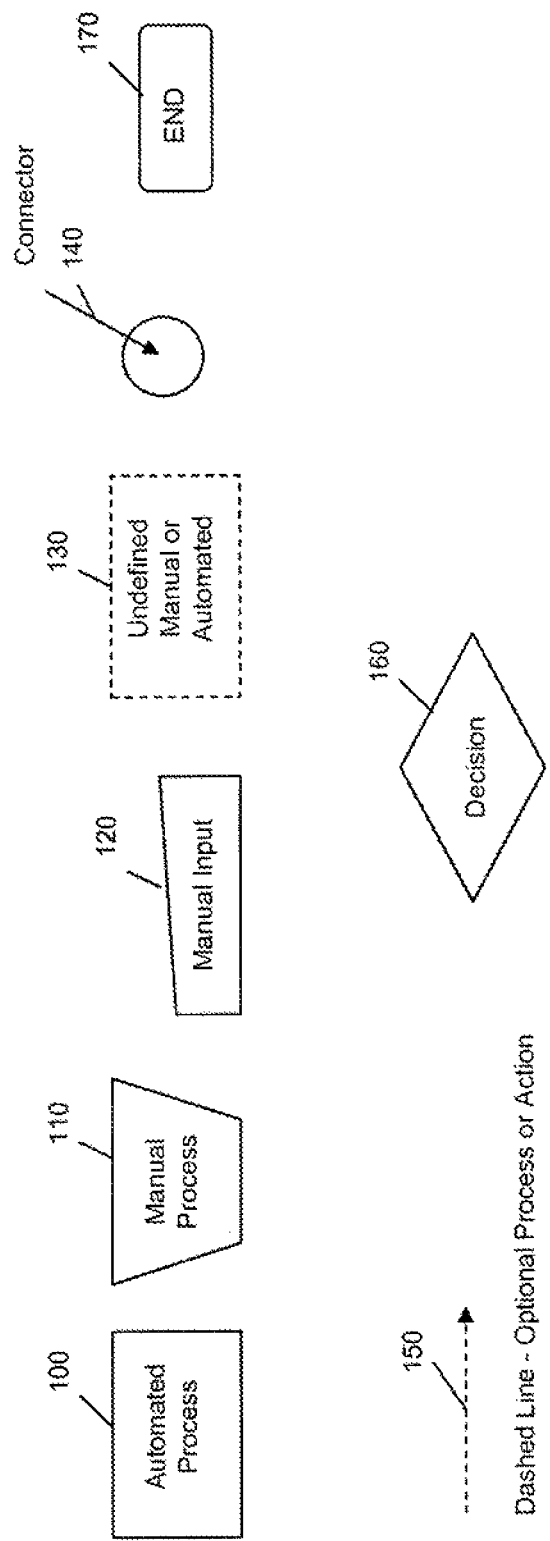
FIG. 4 provides a legend for symbols used in the use case examples of FIGS. 5-20 below.

Referring now to FIG. 4, which exemplifies the process flow symbols used in FIGS. 5-20 below, these symbols are:

a rectangle 100, representing an automated process;

a funnel-shaped trapezoid 110, representing a manual process;

an irregular rectangle 120, representing a manual input;

a dashed rectangle 130, representing a process that may be manual or automatic;

a solid arrow 140, representing a connector in the process flow;

a dashed arrow 150, representing an optional connector or branch in the process flow;

a diamond 160, representing a decision step; and, a rounded rectangle 170, representing the end of a process.

Figure 5:
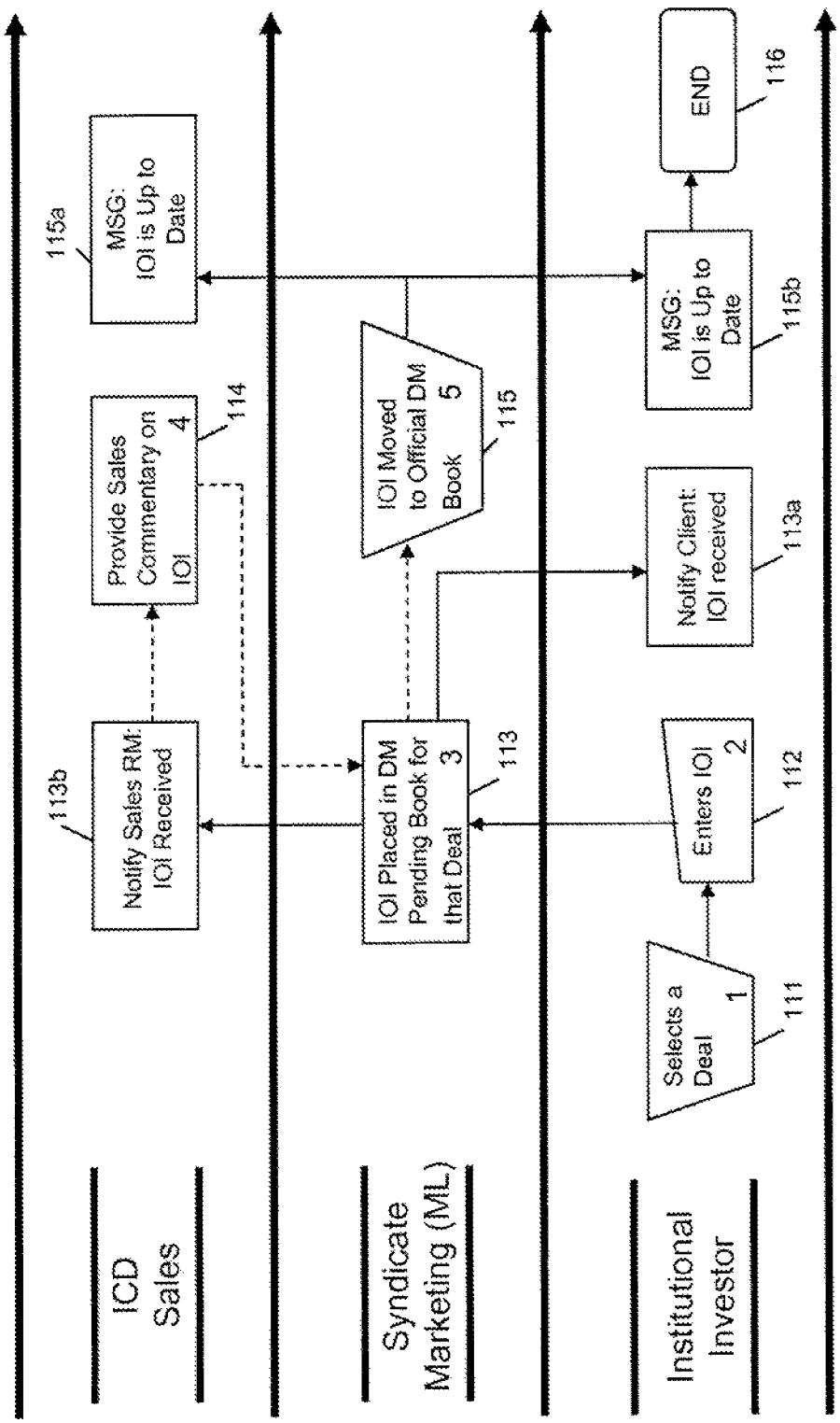
FIG. 5 depicts the case in which an institutional investor enters an IOI for the first time.

Reference is now made to FIG. 5, which depicts the case in which an institutional investor enters an IOI. In the depicted process flow, it is assumed that:

(1) the institutional investor ("II") is properly permissioned to use the i-Deal system;

(2) the in-house sales person is properly permissioned as well;

(3) client and coverage team are tightly coupled;

(4) a notification mechanism (e.g., e-mail, push technologies, pager, etc.) exists for the II, in-house institutional sales ("ICD") and ECM;

(5) the deal-in-question employs a "Hard Pot Model," such that only one IOI per client (per deal/tranche) is permitted;

(6) No IOI exists for the particular client, with respect to the deal/tranche-in-question; and, (7) the IOI's are Institutional Pot Orders (or Institutional Retention in the case of sole managed deals).

Still referring to FIG. 5, the process begins with selection 111 of a deal. Selection 111 involves an II will logging into the i-Deal system, and selecting a deal (and/or tranche) for which he/she is permissioned. An II may have access to only one tranche. This will typically be dictated by region code. A given deal may have one or more tranches (e.g., geographic location/product type).

Still referring to FIG. 5, the next step 112 involves the II entering an IOI. Each II has a unique id, which will appear on the i-Deal screen, and will also be made available internally to the i-Deal application. The II may then enter an IOI amount, select a particular salesperson or broker/dealer, indicate whether the IOI is firm, and enter any appropriate comments.

Still referring to FIG. 5, the next step 113 places the entered IOI into the DM Pending Book; thus, the IOI will automatically populate the DM Pending Book for that deal. Without the need for any action by ECM, a message will be sent 113a/113b to both the II and ICD that an order has been received. Use of a pending book allows ECM to control what orders and information are allowed into the official book. The pending book serves as a work area for ECM, where information can be adjusted, audited and validated, prior to moving the IOI 115 to the official book.

Often, the sales force will want to provide additional color on a given IOI. If they take that action 114, the IOI will be updated accordingly in the pending book. If the IOI has already been moved 115 to the official book, an "out of date" notification will be sent to Sales and ECM—but NOT to the Institutional Investor, as these are internal comments only. I-Deal may be configured such that only a single sales person is permissioned to control the entry of comments on a given IOI.

Finally, and still referring to FIG. 5, if the ECM deems the IOI acceptable, they can highlight the order in the pending book and click on the Populate button—which causes the IOI to be moved 115 to the official book. Prior to process termination 116, a message will be automatically sent 115a/115b to ICD and the II indicating that the IOI has become part of the overall demand for the deal.

Figure 6:
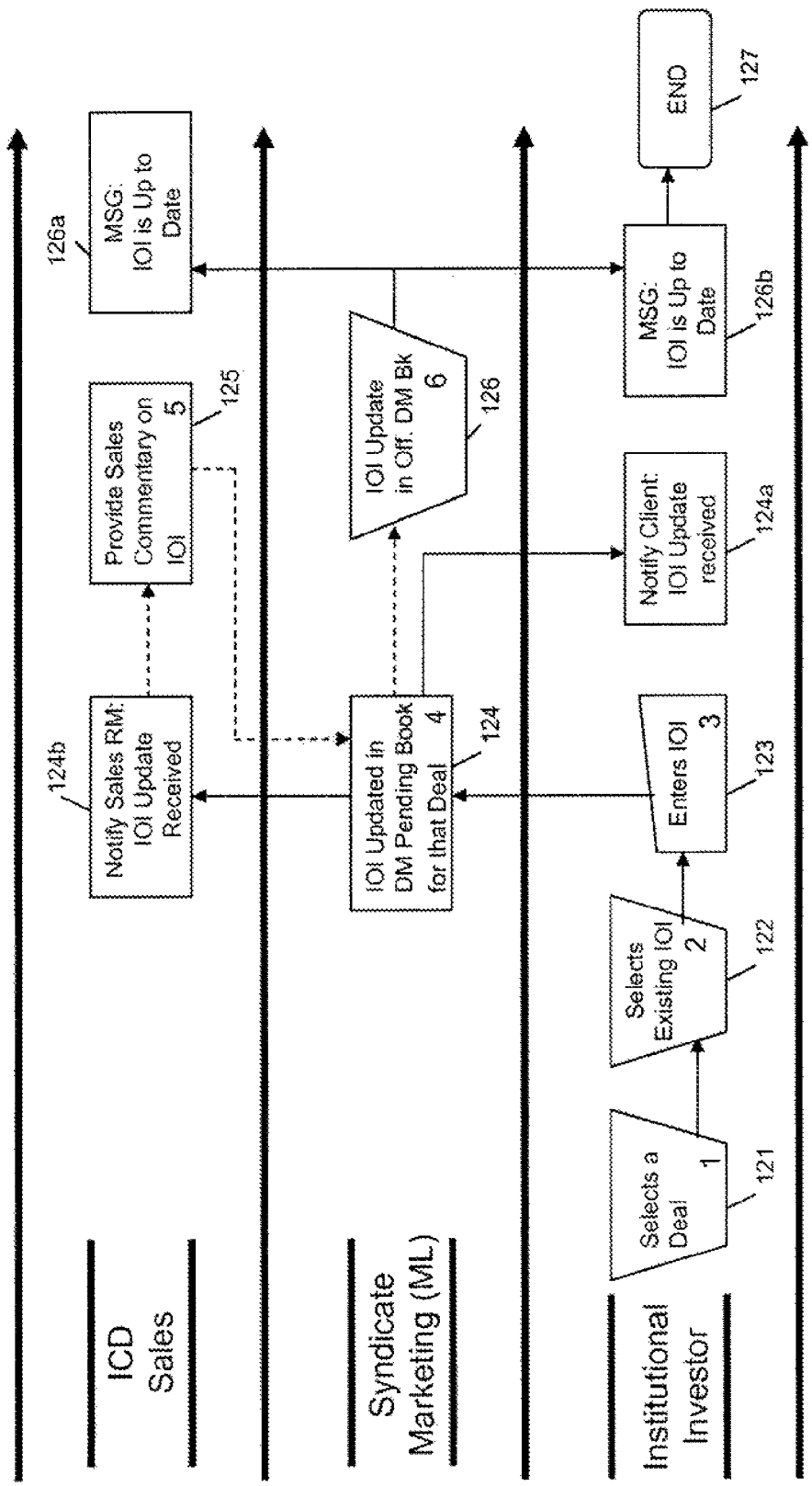
FIG. 6 depicts the case in which an institutional investor updates a previously-entered IOI.

Reference is now made to FIG. 6, which depicts the case in which an institutional investor updates a previously-entered IOI. The assumptions underlying the FIG. 12 process are the same as those for FIG. 11, except that FIG. 12 assumes that an IOI has been previously entered, by the II, for the deal (and/or tranche) in question.

Figure 11:
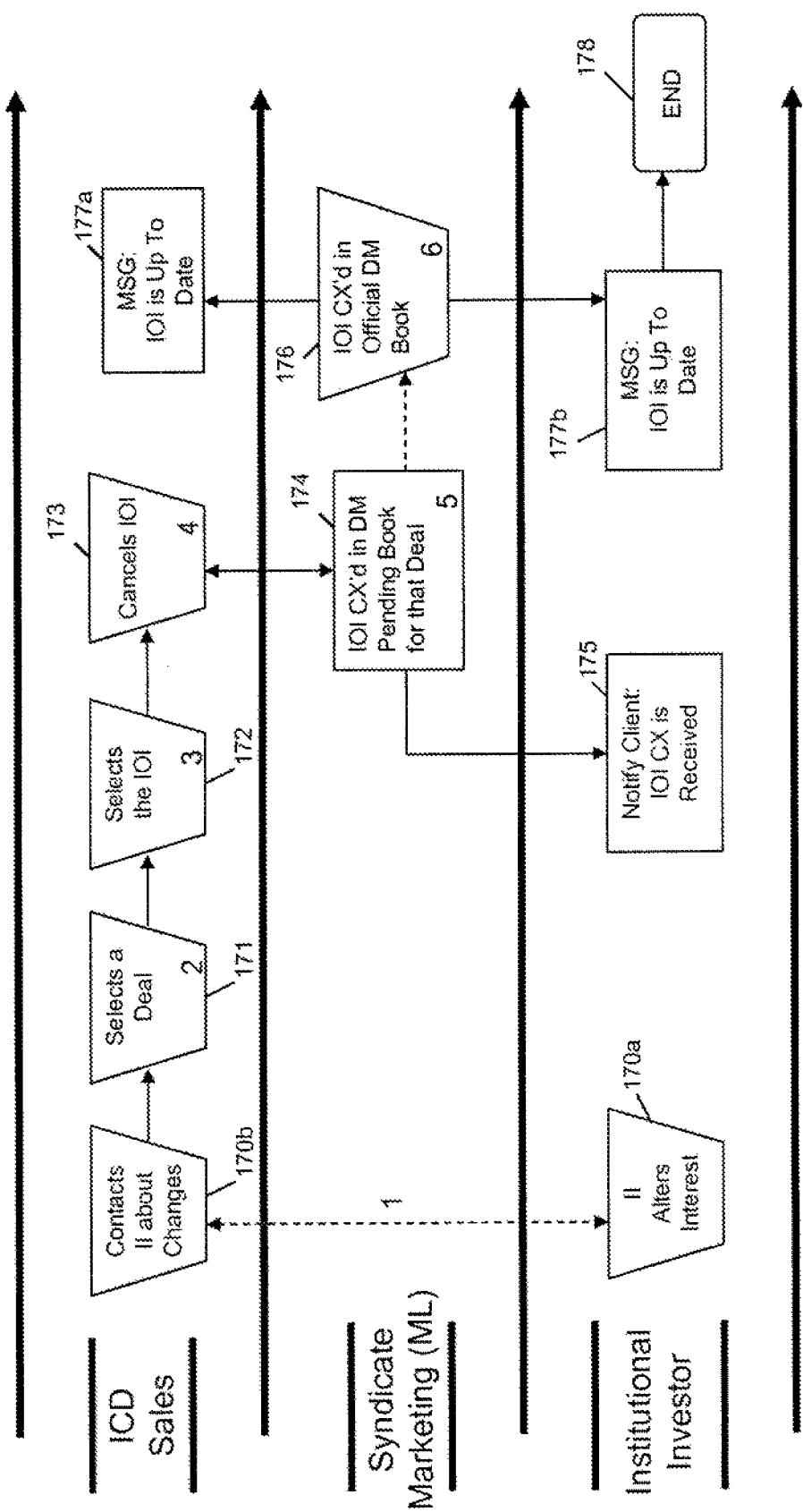
FIG. 11 depicts the case in which sales cancels a previously-entered IOI on behalf of an institutional investor.

Referring still to FIG. 6, the process begins with the II selecting a deal 121 in a manner analogous to step 111 (of FIG. 11). After selecting a deal, the current IOI already entered should be available for editing. The II then clicks on an Update IOI button to select 122 the previously-entered IOI for updating. At step 123, the II user may edit selected fields of the previously-entered IOI. The field(s) available for edit at step 123 preferably include amount.

Next, the edited IOI is updated 124 in the pending book, in a similar manner to step 113 (of FIG. 5) and appropriate update messages 124a/124b are sent to the client and sales, respectively. Optionally, a sales commentary may be entered 125 in a manner similar to step 114 (of FIG. 5). Finally, the IOI is optionally updated 126, by ECM, in the official book, prior to process termination 127. Step 126 is optional, since ECM is not required to facilitate multiple changes to IOI's, especially on "hot deals."

Figure 7:
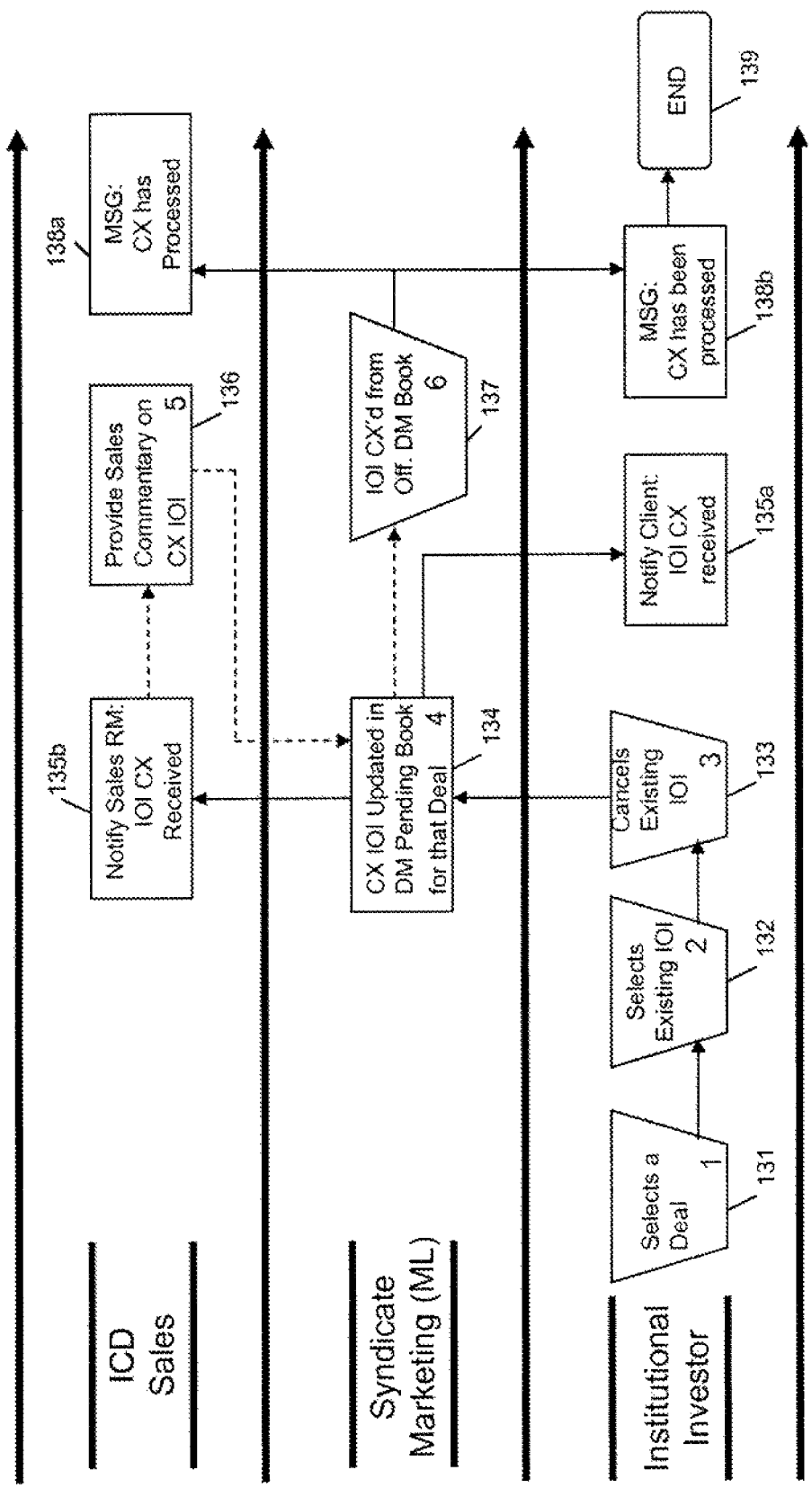
FIG. 7 depicts the case in which an institutional investor cancels a previously-entered IOI.

Reference is now made to FIG. 7, which depicts the case in which an institutional investor cancels a previously-entered IOI. The assumed precondition for the FIG. 13 process are the same as those for FIG. 6, and steps 131 and 132 (of FIG. 7) are analogous to steps 121 and 122 (of FIG. 6), respectively.

Referring still to FIG. 7, once a previously-entered IOI is selected, the II will have the opportunity to cancel the IOI 133 by clicking on the Cancel Button. To ensure that this is not an error, the II should preferably be prompted with a message, explaining his/her actions and the resulting effect on his/her deal participation (or lack thereof). At step 134, the cancelled IOI is updated in the DM Pending Book—in a similar manner to step 124 (of FIG. 6); however in the case of step 134, alerts 135a/b are preferably sent, since the demand for the deal will be decreased. A sales commentary 136 may be entered. The cancelled IOI is updated 137 in the official book. And appropriate confirmatory messages 138a/b are sent, prior to process termination 139.

Figure 8:
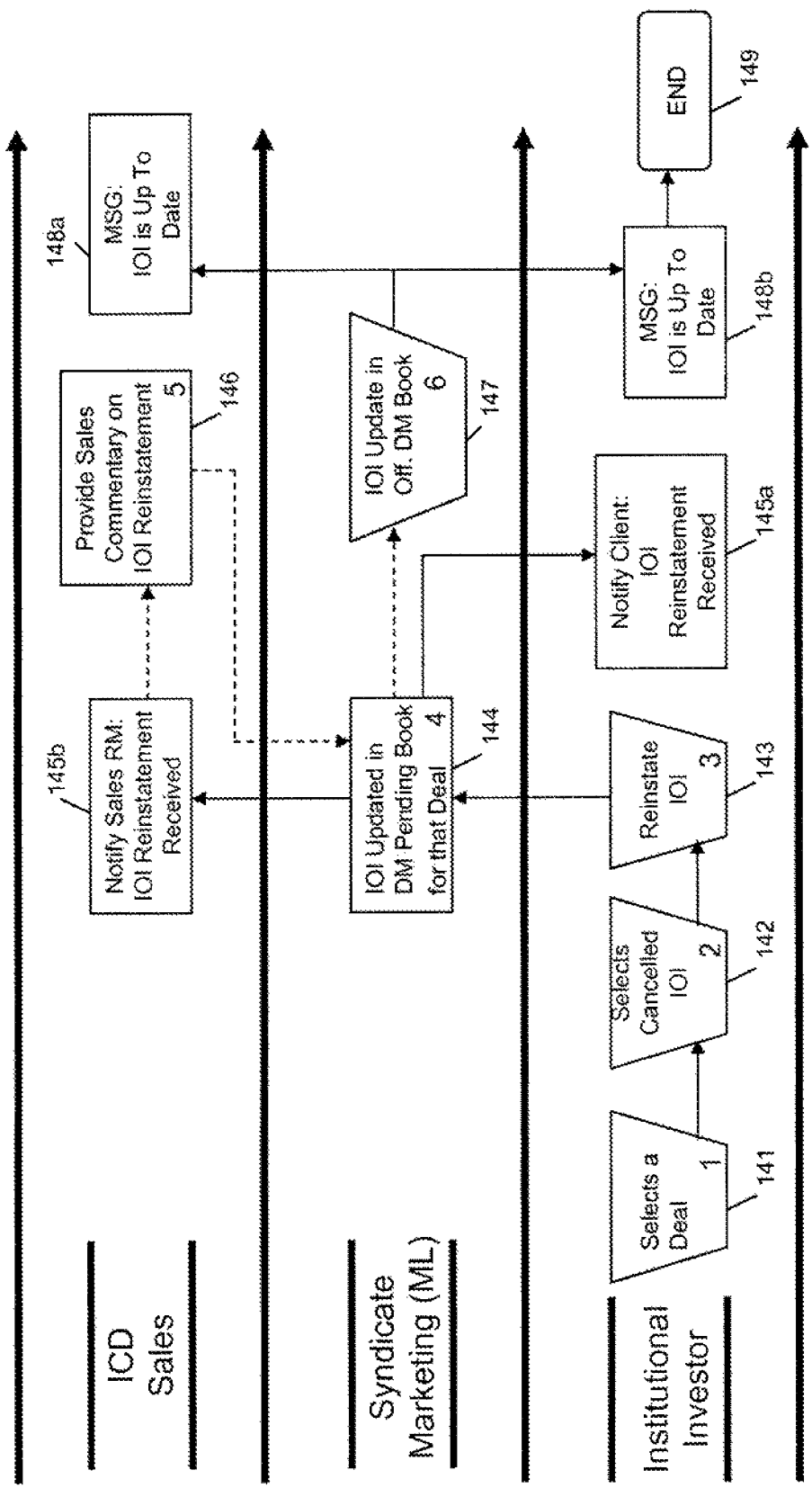
FIG. 8 depicts the case in which an institutional investor reinstates a previously-cancelled IOI.

Reference is now made to FIG. 8, which depicts the case in which an institutional investor reinstates a previously-cancelled IOI. The depicted process begins with selection 141 of a deal, followed by selection 142 of a previously-cancelled IOI. IOI's that are cancelled are not deleted from the i-Deal database. Therefore, the II can select the IOI and bring it up, in grayed out form. At step 143, the already cancelled TOT is reinstated by clicking on the a Reinstate Button. To ensure that this is not an error, the II should be prompted with a message, explaining his/her actions and the resulting effect on his/her deal participation. The reinstated MI is next 144 updated in the DM Pending Book; an alert is then preferably sent to interested parties 145a/b, indicating that an IOI has been reinstated. A sales commentary 146 may be entered. The 'reinstated IOI is updated 147 in the official book. And appropriate confirmatory messages 148a/b are sent, prior to process termination 149.

Figure 9:
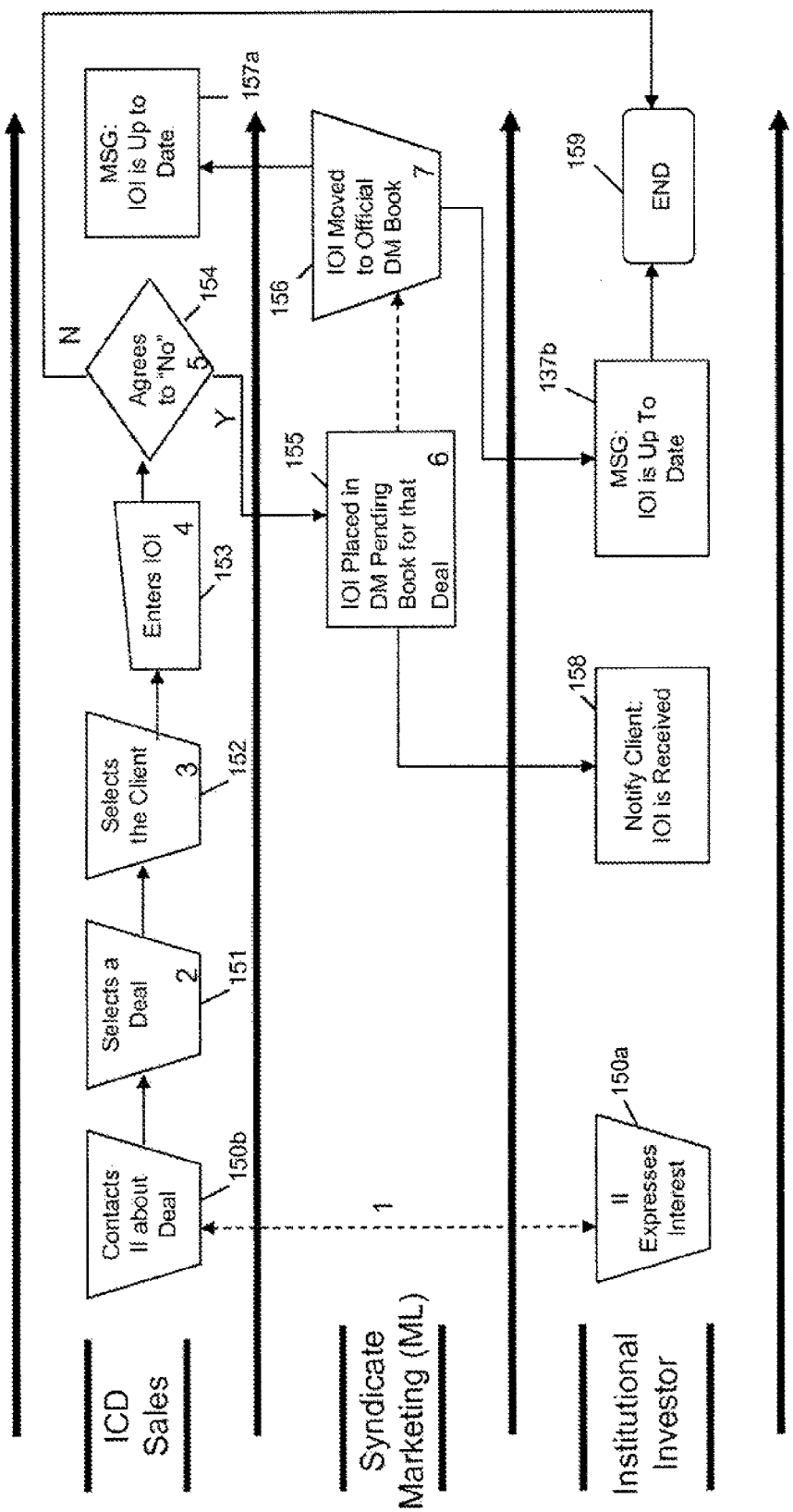
FIG. 9 depicts the case in which sales enters an IOI on behalf of an institutional investor.

Reference is now made to FIG. 9, which depicts the case in which ICD sales enters IOI on behalf of an institutional investor. This use case allows for a dialogue initiated by either ICD sales 150b or the II 150a regarding interest in a given deal. Either way, an ICD Salesperson will log into i-Deal and select 151a deal (tranche) for which he/she is permissioned. The salesperson will then select a client 152 that he/she is permitted to serve (i.e., the salesperson must be a member of the coverage team for the selected client). Next, the ICD salesperson enters an IOI amount 153 for the selected client/deal. The IOI will then automatically populate 155 the DM Pending Book for that deal. Prior to any action by ECM, a message will be sent to both the II 158 and ICD salesperson (not shown) that an MI has been received. In this case, the ICD salesperson, will get confirmation within his/her current screen. At step 156, the IOI is moved to official book; this is preferably done by ECM highlighting the IOI in the pending book and clicking on the Populate button. Messages are then sent to Sales 157a and the II 157b indicating that the order has become part of the overall demand for the deal.

Figure 10:
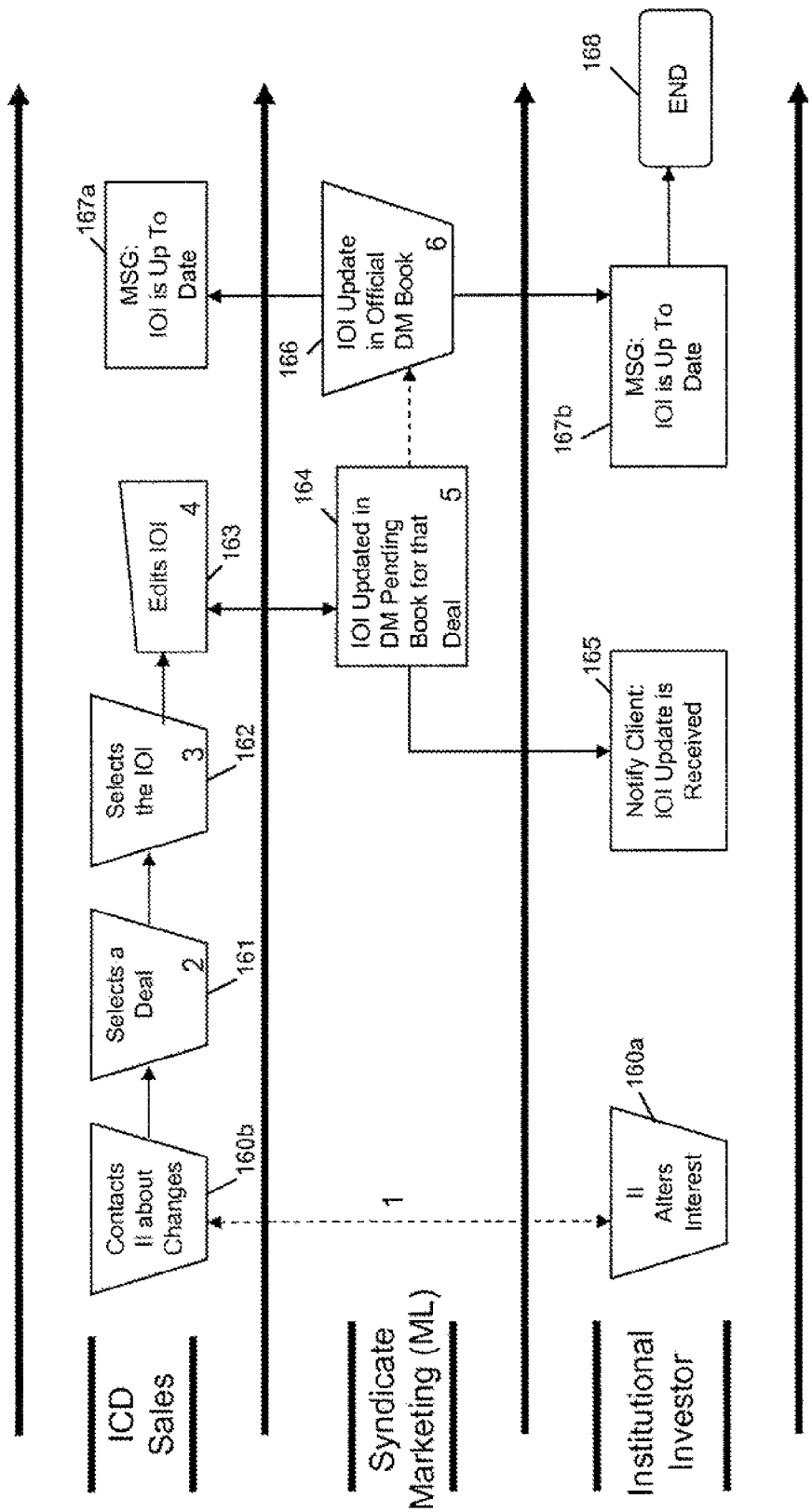
FIG. 10 depicts the case in which sales edits/updates an EDI on behalf of an institutional investor.

Reference is now made to FIG. 10, which depicts the case in which ICD sales edits/updates an IOI on behalf of an institutional investor. The process begins either with the II contacting sales 160a or the converse 160b, after which ICD sales proceed to select 161 the deal for editing/updating, the edit/update is entered 163, and the edited/updated IOI is moved 164 to the pending book (and the client is notified 165 that the request to update has been received). After approval, the update is moved 166 to the official book, notifications 167a/b of acceptance are sent, and the process terminates 168.

Reference is now made to FIG. 11, which depicts the case in which ICD sales cancels a previously-entered IOI on behalf of an institutional investor. The process begins either with the II contacting sales 170a or the converse 170b, after which ICD sales proceed to select 171 the deal for IOI cancellation. After reviewing a warning message, the ICD salesperson enters 173 the cancellation command, whereupon the cancelled IOI is moved 174 to the pending book (and the client is notified 175 that the request to cancel has been received). After approval, the IOI is cancelled 176 in the official book, notifications 177a/b of cancellation are sent, and the process terminates 178. N.B.: An IOI is preferably never "deleted" entirely from the electronic records, since it is desirable to track this action for audit purposes.

Figure 12:
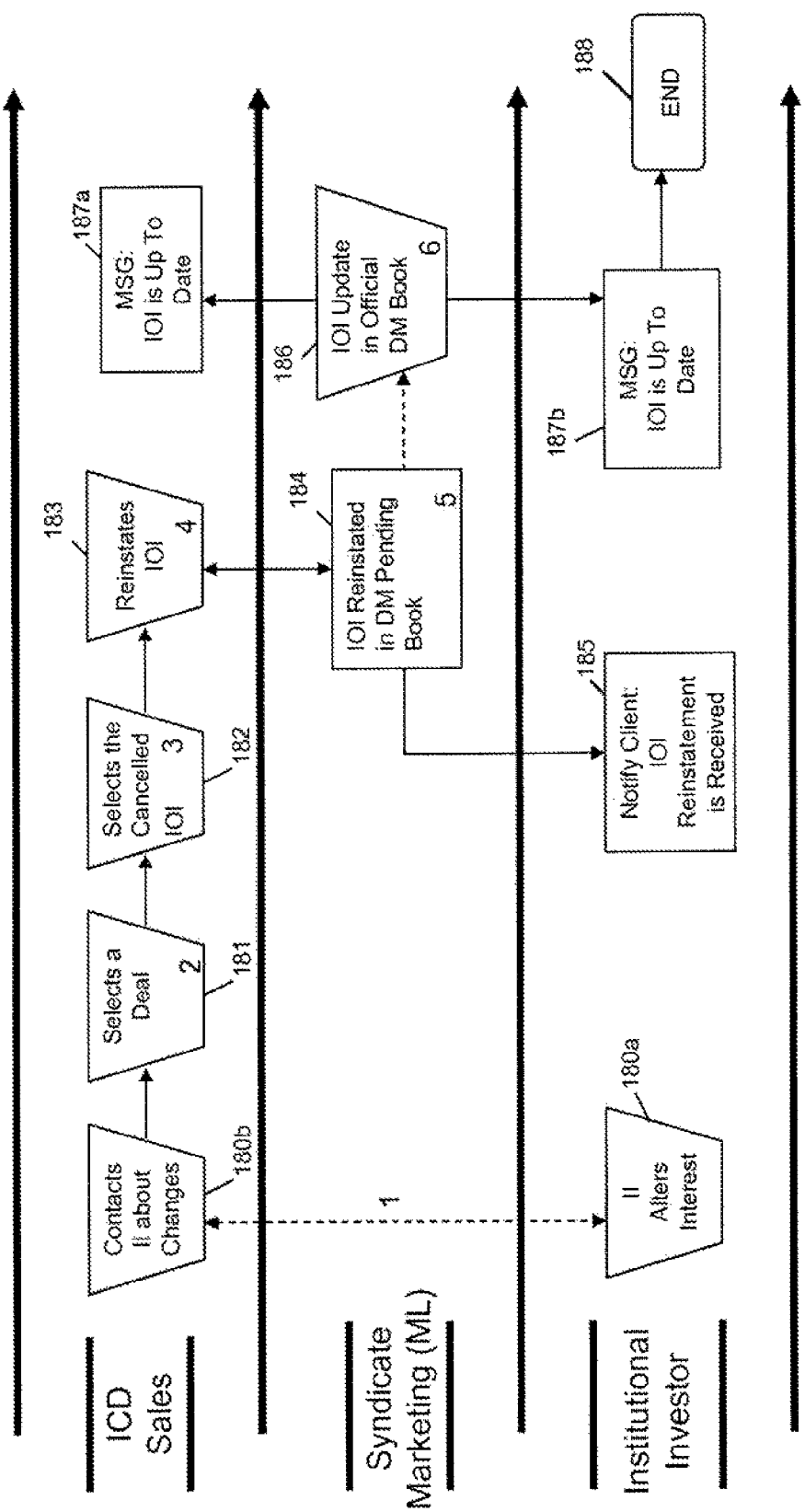
FIG. 12 depicts the case in which sales reinstates a previously-canceled IOI on behalf of an institutional investor.

Reference is now made to FIG. 12, which depicts the case in which ICD sales reinstates a previously-canceled IOI on behalf of an institutional investor. The process begins either with the II contacting sales 180a or the converse 180b, after which ICD sales proceed to select the deal 181 and the previously-canceled IOI 182 for reinstatement. To ensure that there is no error, the salesperson should be prompted with a message, explaining his/her actions and the resulting effect on deal participation. The reinstate commanded is entered 183, and the reinstated IOI is moved 184 to the pending book (and the client is notified 185 that the request to reinstate has been received). After approval, the reinstated IOI is moved 186 to the official book, notifications 187a/b of acceptance are sent, and the process terminates 188.

In addition to those features illustrated and described in connection with FIGS. 9-12 above, an ICD salesperson can also use the i-Deal system to view IOIs/allocations on current deals (not settled) for a given deal, as well as across multiple deals, and can search, sort and filter:
  by deal;
  by IOI/allocation;
  by customer name/account;
  by order type;
  by order status; and/or,
  by salesperson (and permissioned sales assistants and sales managers).

Figure 13:
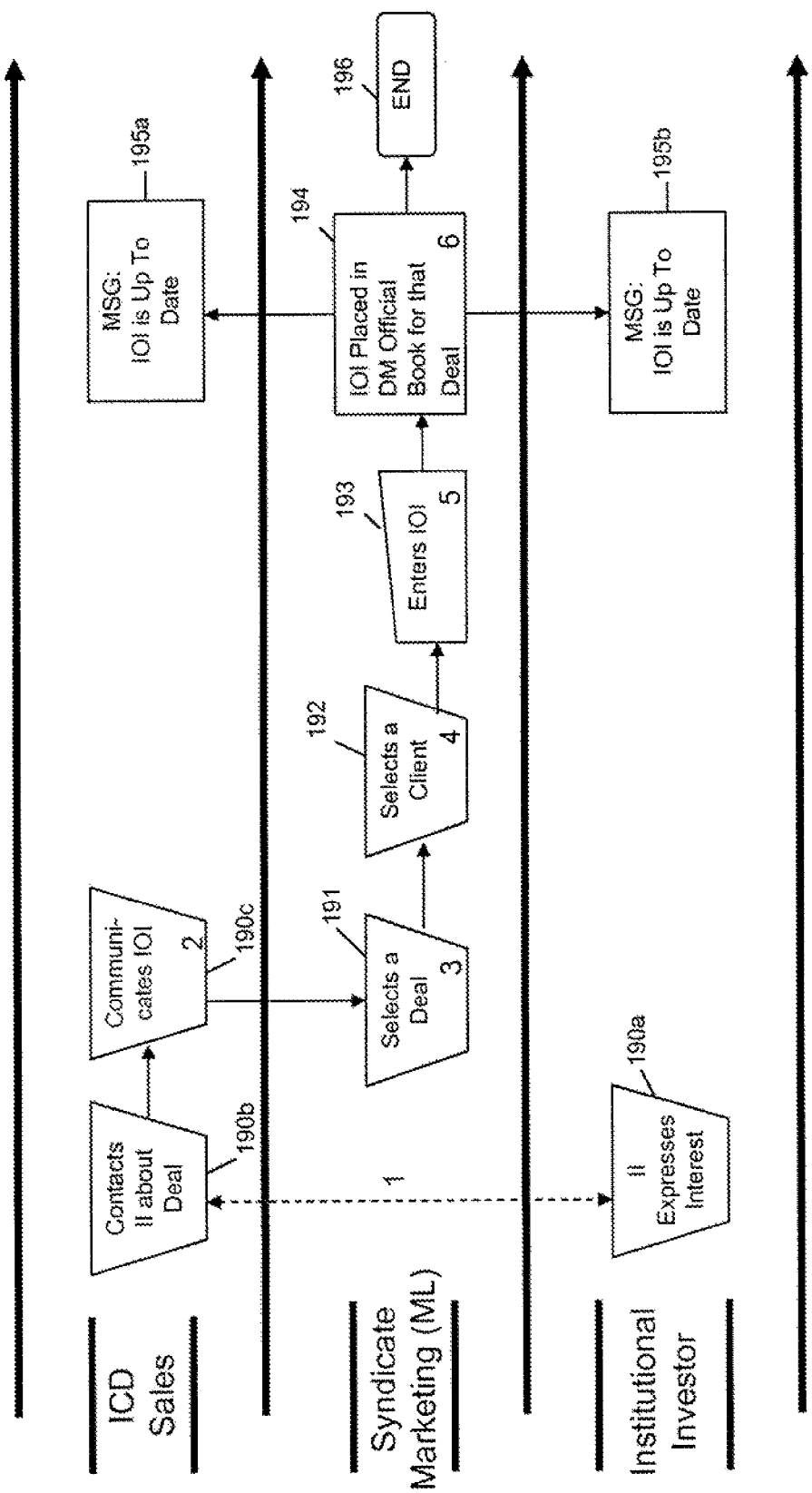
FIG. 13 depicts the case in which ECM enters an In on behalf of an institutional investor, at the request of sales.

Reference is now made to FIG. 13, which depicts the case in which ECM enters an IOI, on behalf of an institutional investor, at the request of ICD sales. In this case, initial interest or contact may begin with the II expressing interest 190a or the ICD salesperson contacting 190b the II about the deal. Either way, once the salesperson receives the MI, he communicates 190c the IOI to ECM, who proceeds to implement the order by selecting the relevant deal 191, selecting the relevant client 192, and entering the IOI 193. (Note: Use of a pending book is not necessary—since ECM is in direct control of the MI entry process.) The newly-entered IOI is placed in the official book 194, notifications to sales 195a and client 195b are sent, and the process terminates 196.

Figure 14:
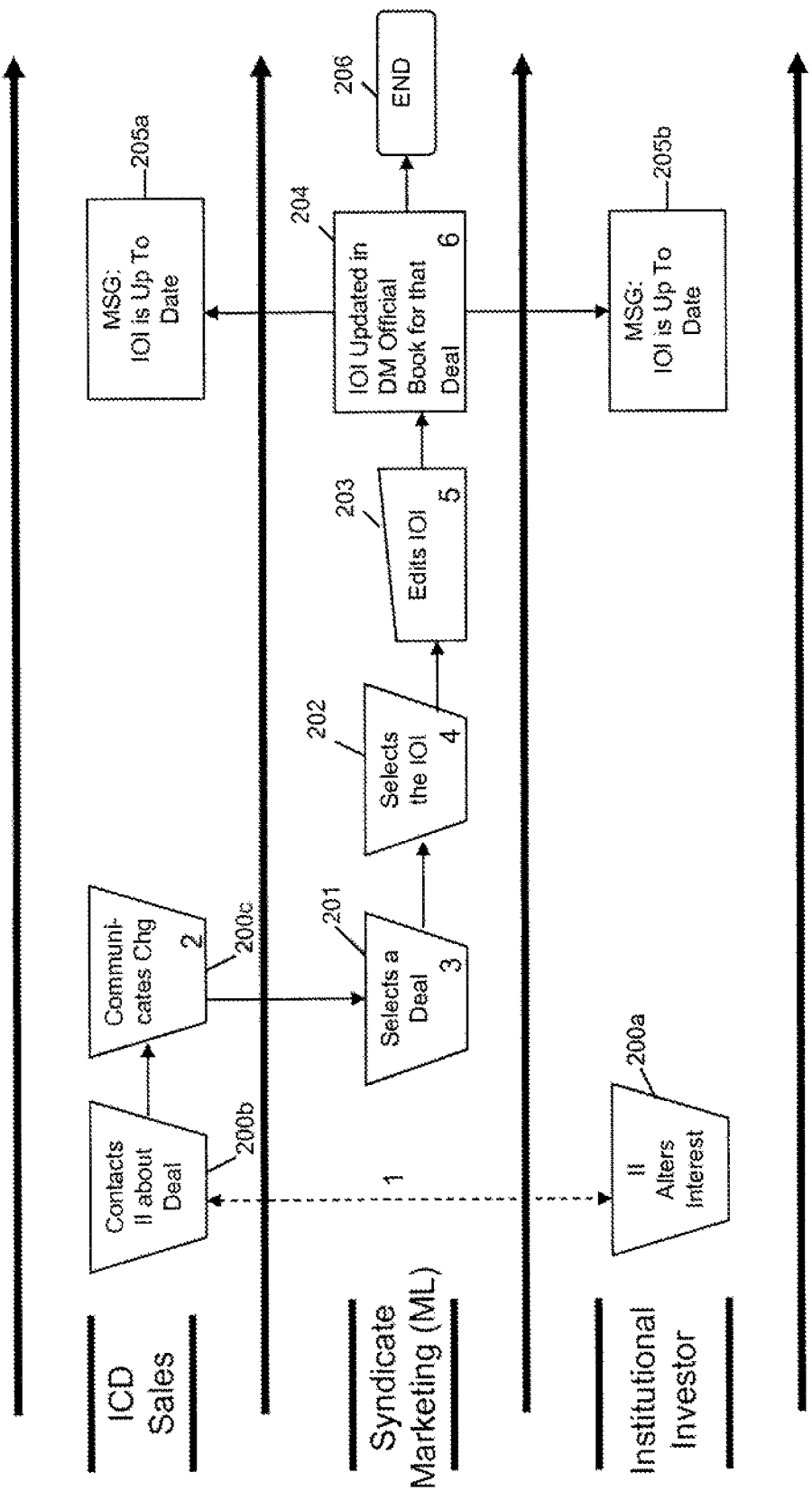
FIG. 14 depicts the case in which ECM modifies a previously-entered IOI, on behalf of an institutional investor, at the request of sales.

Reference is now made to FIG. 14, which depicts the case in which ECM modifies a previously-entered IOI, on behalf of an institutional investor, at the request of ICD sales. In this case, initial desire to modify may begin with the II expressing interest 200a or the ICD salesperson contacting 200b the II. Either way, once the salesperson receives the request to modify the previously-entered IOI, he communicates 200c the request to ECM, who proceeds to implement the request by selecting the relevant deal 201, selecting the relevant client 202, and modifying the IOI 203 in accordance with the request. (Note: Use of a pending book is not necessary—since ECM is in direct control of the ICI modification process.) The modified IOI is placed in the official book 204, notifications to sales 205a and client 205b are sent, and the process terminates 206.

Figure 15:
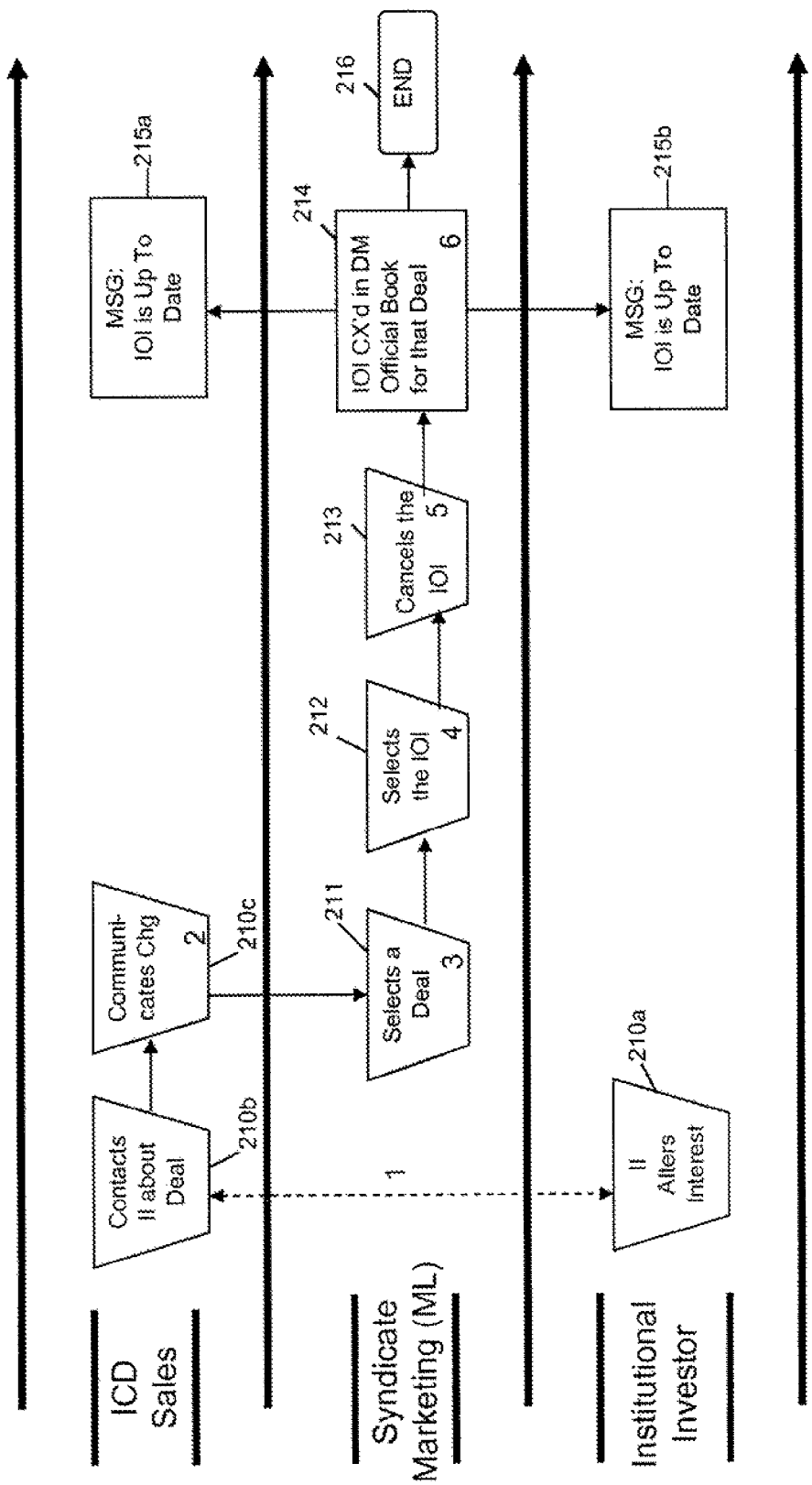
FIG. 15 depicts the case in which ECM cancels a previously-entered IOI, on behalf of an institutional investor, at the request of sales.

Reference is now made to FIG. 15, which depicts the case in which ECM cancels a previously-entered IOI, on behalf of an institutional investor, at the request of ICD sales. In this case, initial desire to cancel may begin with the II expressing interest 210a or the ICD salesperson contacting 210b the II. Either way, once the salesperson receives the request to cancel the previously-entered ICI, he communicates 210c the request to ECM, who proceeds to implement the request by selecting the relevant deal 211, selecting the relevant client 212, and canceling the IOI 213. (Note: Use of a pending book is not necessary—since ECM is in direct control of the ICI modification process.) The cancellation is entered in the official book 214, notifications to sales 215a and client 215b are sent, and the process terminates 216. An additional, high-level internal notification may also be sent, since demand for the deal has been reduced.

Figure 16:
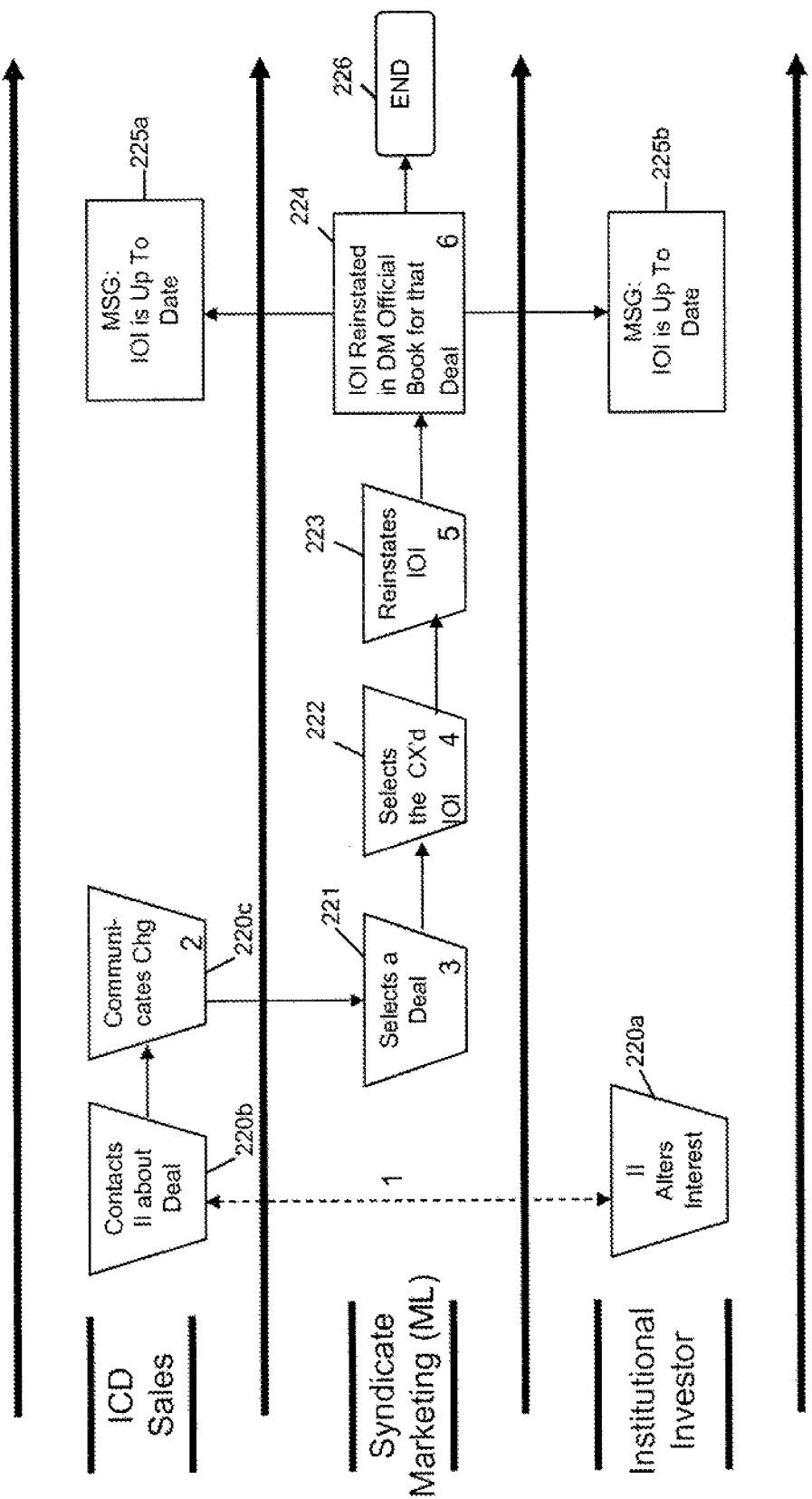
FIG. 16 depicts the case in which ECM reinstates a previously-cancelled IOI, on behalf of an institutional investor, at the request of sales.

Reference is now made to FIG. 16, which depicts the case in which ECM reinstates a previously-cancelled ICI, on behalf of an institutional investor, at the request of ICD sales. In this case, initial desire to restore may begin with the II expressing interest 220a or the ICD salesperson contacting 220b the II. Either way, once the salesperson receives the request to reinstate the previously-cancelled IOI, he communicates 220c the request to ECM, who proceeds to implement the request by selecting the relevant deal 221, selecting the relevant client 222, and reinstating the previously-cancelled IOI 223. (Note: Use of a pending book is not necessary—since ECM is in direct control of the IOI modification process.) The reinstatement is entered in the official book 224, notifications to sales 225a and client 225b are sent, and the process terminates 226.

Figure 17:
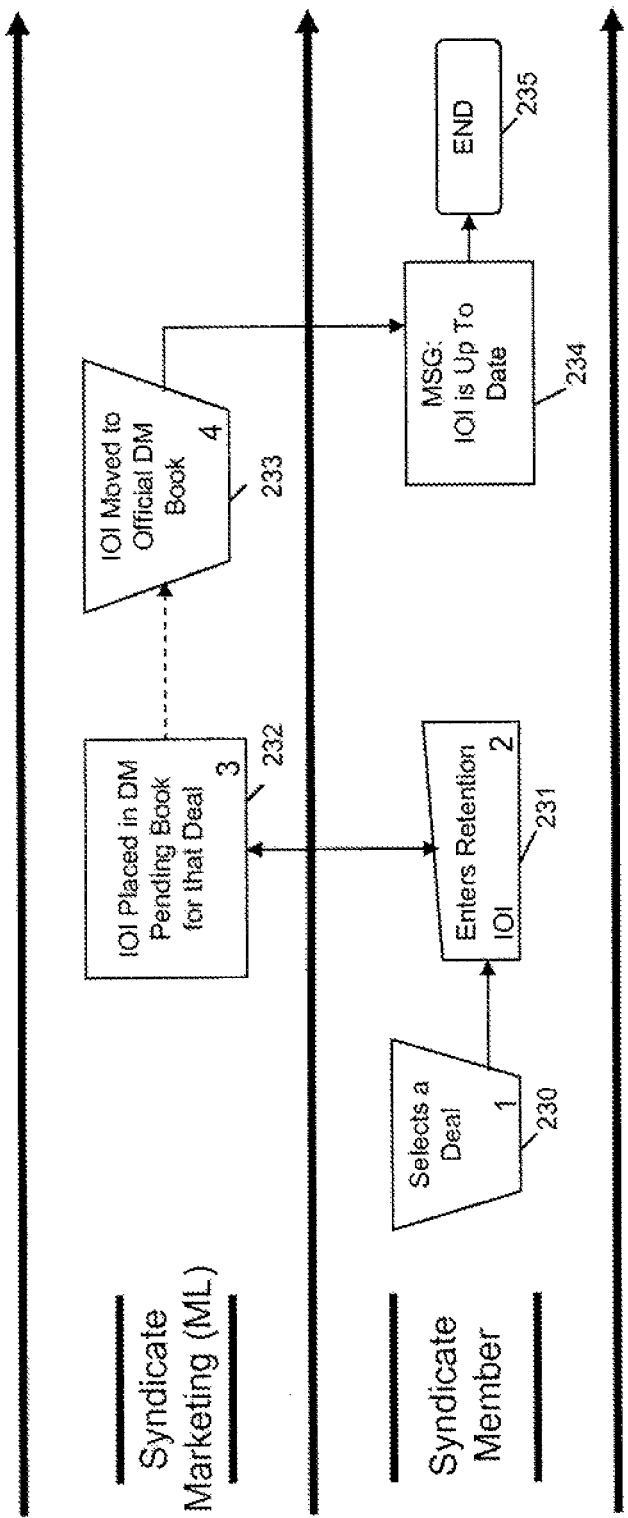
FIG. 17 depicts the case in which a syndicate member enters an initial retention IOI.

Reference is now made to FIG. 17, which depicts the case in which a syndicate member enters an initial retention IOI. The process begins with a syndicate member logging into i-Deal and selecting a deal (tranche) 230 for which he/she is permissioned. The member then attempts to enter 231a retention IOI for the first time. The deal may have one or more tranches (geographic location/product type). The Syndicate Member's unique id is preferably stored.

The new retention IOI is then placed 232 in the pending book and, after review/approval by ECM, is moved 233 to the official book. (Of course, requests for institutional retention are rarely rejected.) Prior to termination 235 of the process, a notice is sent 234 to the syndicate member confirming acceptance of the retention IOI.

Figure 18:
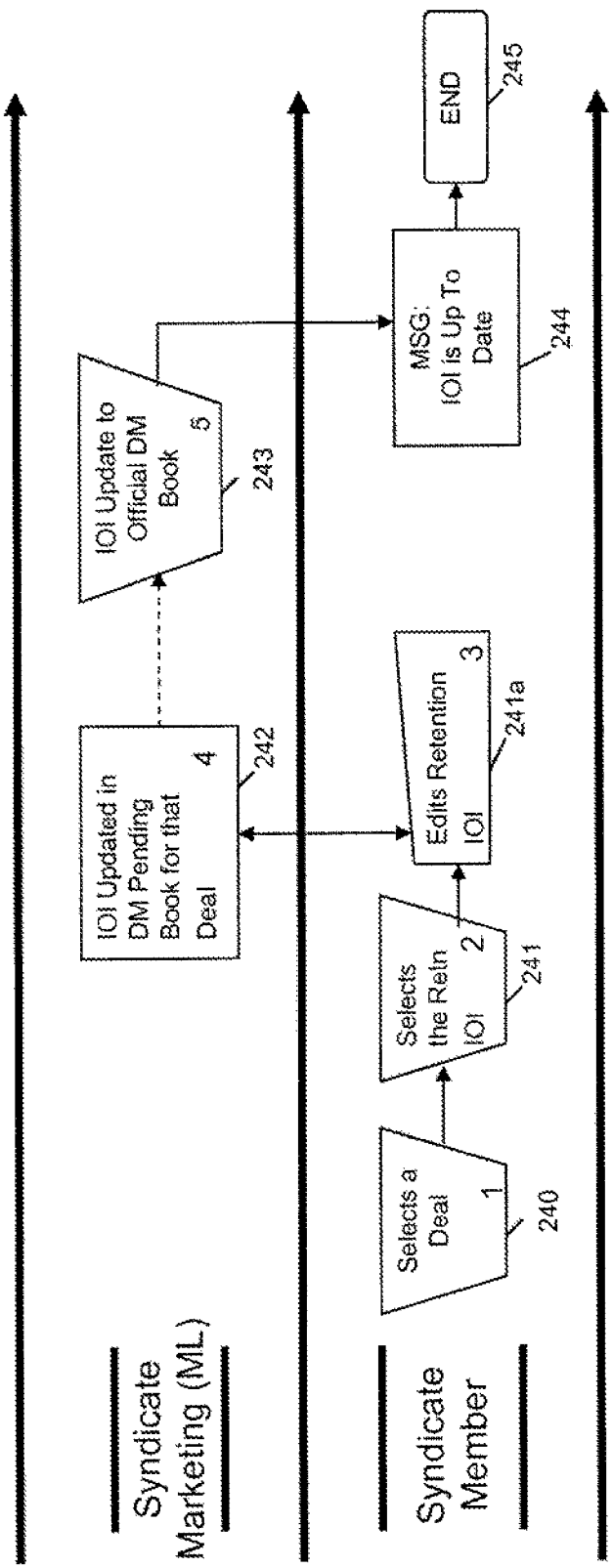
FIG. 18 depicts the case in which a syndicate member modifies a previously-entered retention IOI.

Reference is now made to FIG. 18, which depicts the case in which a syndicate member modifies a previously-entered retention IOI. The process begins with the syndicate member selecting a deal 240, the IOI 241, and requesting 241a the modification. The modified retention IOI is then placed 242 in the pending book and, after review/approval by ECM, is moved 243 to the official book. Prior to termination 245 of the process, a notice is sent 244 to the syndicate member confirming modification of the retention IOI.

Figure 19:
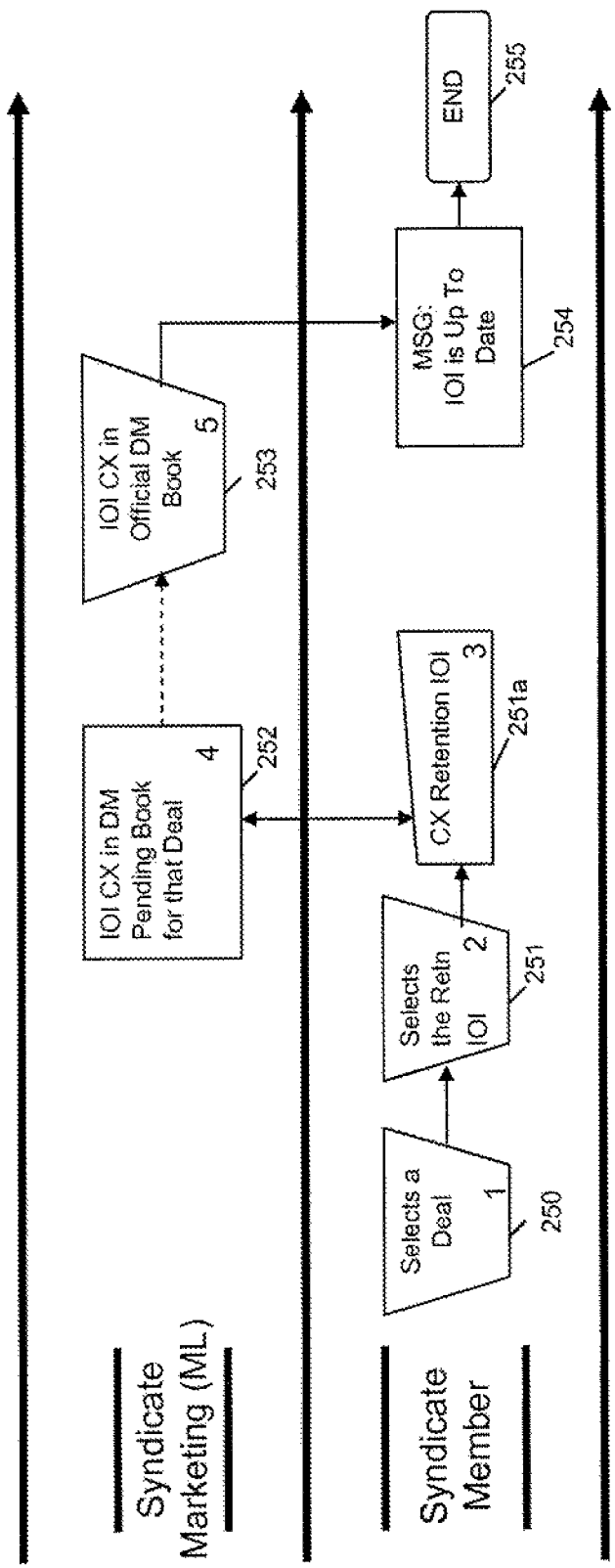
FIG. 19 depicts the case in which a syndicate member cancels a previously-entered retention IOI; and, FIG. 20 depicts the case in which a syndicate member reinstates a previously-cancelled retention IOI.

Reference is now made to FIG. 19, which depicts the case in which a syndicate member cancels a previously-entered retention IOI. The process begins with the syndicate member selecting the deal 250, the IOI 251, and requesting 251a cancellation thereof. The identified retention IOI is then cancelled 252 in the pending book and, after review/approval by ECM, is similarly cancelled 253 in the official book. Prior to termination 255 of the process, a notice is sent 254 to the syndicate member confirming cancellation of the identified retention IOI.

Figure 20:
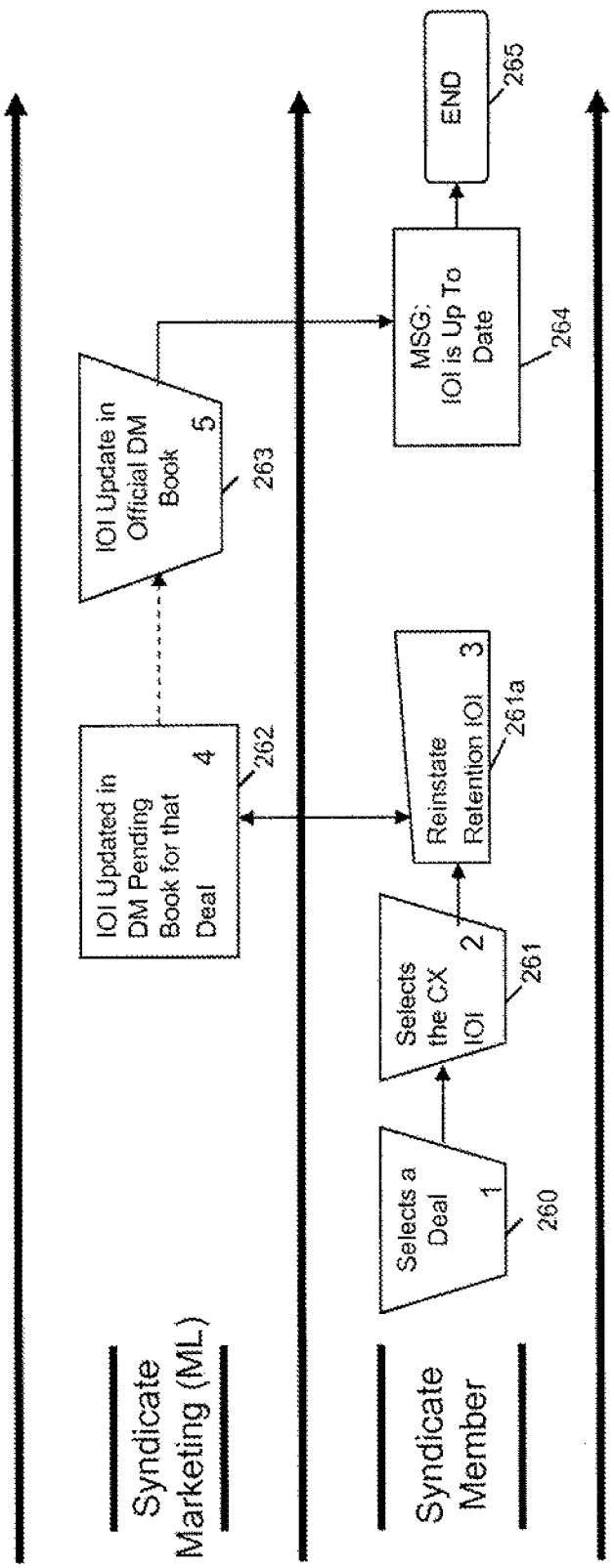

Reference is now made to FIG. 20, which depicts the case in which a syndicate member reinstates a previously-cancelled retention IOI. The process begins with the syndicate member selecting the deal 260, the previously-cancelled IOI 261, and requesting 261a reinstatement thereof. The identified retention IOI is then reinstated 262 in the pending book and, after review/approval by ECM, is similarly reinstated 263 in the official book. Prior to termination 265 of the process, a notice is sent 264 to the syndicate member confirming reinstatement of the identified retention IOI.

The i-Deal system also delivers capabilities to various in-house and syndicate users, as well as selected outside users (e.g., investors, issuer) to facilitate roadshows. Basically, a roadshow is an event in which ECM coordinates various types of meetings to market an upcoming New Issue to potential investors. The goal set out for ECM is to get the issuer (the company selling its stock in a public offering) in front of as many potential buyers as possible.

To expedite the process of setting up a roadshow, ECM uses The Roadshow System, an application specifically designed for warehousing meeting information efficiently in a calendar format. The Roadshow system is used for tracking all marketing of Syndicate New Issues, Issuer Non-deal Roadshows and Analyst Roadshows. The system contains all significant information pertaining to the roadshows and the underlying deals, such as various management meetings, pricing/filing dates, conference calls, one-on-one meetings, group functions, research blackout dates and holidays. It also keeps profiles of institutions and their holdings and allows ECM to coordinate its marketing with that of other areas such as Sales, Research and Special Events.

Among the events tracked by the present invention are a variety of pre-filing meetings, pre-marketing meetings, and marketing meetings. The pre-filing meetings typically include:
 (i) Meetings to discuss structure, valuation and marketing issues; and,
 (ii) Meetings to discuss due diligence issues, such as legal issues, research issues, deal economics, etc.

The pre-marketing meetings typically include:
 (i) A "kick-off" meeting, during which an in-house research analyst prepares and educates the in-house sales force (with the regional sales force is hooked in telephonically) for a specific upcoming issue. The analyst will typically review the story, estimates and valuation for the deal;
 (ii) A presentation by the issuer for the in-house sales force (with the regional sales force hooked in telephonically).

The purpose of this meeting is two-fold: (1) to educate and prepare the sales force to effectively market the new issue to their accounts; (2) to provide a "dry-run" for the issuer management to present its story and hear questions and comments, from the syndicate and others who will be involved in the realization of the deal; and, (iii) For international deals, a meeting at which the research analyst educates potential institutional investors on an upcoming new issue before the management roadshow.

The marketing meetings typically include:

One-on-one—self-explanatory; a meeting in which the issuer and a potential institutional investor are the only necessary participants. This type of meeting is usually for the largest potential buyers.

Group—most popular during breakfast, lunch and dinner, these meetings usually include a formal presentation hosted by the issuer for investors. The size of a group meeting is determined by the number of investors in attendance, and can vary from 3 to 200 attendees. The participants are usually investors who were not able to get (or did not need) a 1-on-1 meeting. In addition, various bankers and research analysts (from co-managers and syndicate member firms) will attend.

Analyst for Accounts—an external conference call hosted by the in-house research analyst for potential investors who need guidance on an upcoming issue. This call usually takes place during the middle of the marketing period. Often, the analyst will give multiple calls, perhaps two for U.S. accounts and one for International accounts.

Management for Accounts—an external conference call hosted by the issuer for potential investors. This is a good way to get the Issuer's presentation out to a broader audience.

While the present invention, as exemplified by the i-Deal system, has been described by illustrative reference to various features and aspects thereof, those skilled in the art will appreciate that no particular aspect or feature of the invention should be considered "essential"—unless expressly set forth in the claims that follow. Those skilled in the art will further appreciate that the claims below, each of which calls (at least in part) for some sort of computer implementation, execution and/or realization, should be construed broadly to include, cover and/or refer to any sort of programmable device(s) whatsoever, including, but not limited to PCs, CPUs, minicomputers, servers, mainframe computers, PDAs, embedded controllers, intelligent terminals, distributed or network-based computers, and computers based on unconventional architectures (e.g., neural networks, data-flow machines, massively parallel machines).

What is claimed is:

1. A method of processing demands for a financial issue, comprising:
   receiving, by a computer, an indication of interest (IOI) for the financial issue from an investor through a remote user terminal;
   entering, by a computer, the received IOI into a holding queue, wherein the received IOI remains in the holding queue until a member of the syndicate reviews the IOI; and
   receiving, by a computer, a command from a syndicate terminal of the member of the syndicate to move the received IOI into an official book of the financial issue after the member of the syndicate has approved the IOI.

2. The method of claim 1, wherein the investor has an unique user ID.

3. The method of claim 1, further comprising:
   sending, by a computer, a message to the investor and a member of in-house institutional sales that the IOI has been received.

4. The method of claim 1, further comprising:
   sending, by a computer, a message to the investor and a member of in-house institutional sales that the IOI has become part of the official book.

5. The method of claim 1, further comprising:
   receiving, by a computer, a request to update information included in the IOI from the remote user terminal;
   receiving, by a computer, updated information included in the IOI from the remote user terminal; and
   entering, by a computer, the IOI with the updated information into the holding queue.

6. The method of claim 1, further comprising:
   receiving, by a computer, a request to cancel the IOI from the remote user terminal;
   removing, by a computer, the IOI from the holding queue or the official book; and
   saving, by a computer, the cancelled IOI in a database.

7. The method of claim 6, further comprising:
   receiving, by a computer, a request to reinstate the cancelled IOI from the remote user terminal; and
   moving, by a computer, the IOI to the holding queue from the database.

8. The method of claim 1, wherein the IOI includes comments from the investor or the at least one member of the syndicate.

9. The method of claim 1, wherein the at least one member of the syndicate has the option to adjust a price or a demand included in the IOI before commanding the computer to move the IOI to the official book.

10. A method of processing demands for a financial issue, comprising:
    receiving, by a computer, an indication of interest (IOI) for an offering from an in-house institutional sales member or a syndicate member on behalf of an investor through a remote user terminal;
    entering, by a computer, the received IOI into a holding queue, wherein the received IOI remains in the holding queue until at least one member of the syndicate reviews the IOI; and
    receiving, by a computer, a command from a syndicate terminal of the member of the syndicate to move the received. IOI into an official book of the financial issue after the member of the syndicate has approved the IOI.

11. A method of displaying a historical view of investor activity comprising:
    receiving, by a computer, an indication of interest (IOI) for an offering from an investor;
    creating, by a computer, a profile for the investor in a computer-readable database, wherein the investor's profile contains information describing the investor's activity in financial offerings;
    storing, in the computer-readable database, information describing details of the IOI in the investor's profile;
    receiving, via an electronic communication link, a request from a user terminal to view the investor's profile;
    displaying, by a computer, the investor's profile including the information describing the details of the IOI and information describing details of a second IOI associated with a second offering submitted by the investor when the investor has submitted more than one IOI.

12. The method of claim 11, further comprising:
    displaying, by a computer, a syndicate determined allocation associated with the second IOI.

13. The method of claim 11, wherein the information describing the details of the second IOI comprises a share price, the second offering, and a number of shares requested.

14. The method of claim 11, wherein the investor profile also includes information about the investors holdings.

15. A computer-implemented method for marketing a financial issue, the method comprising:
- receiving, by a programmable device, information concerning a deal event scheduled for a date and associated with the marketing of the financial issue;
- receiving, by a programmable device, indications of interest (IOI) for the financial issue from an investor;
- receiving, by a programmable device, allocation information applied to the IOI by at least one member of the syndicate;
- storing, in a computer-readable database, the information concerning the deal event, the IOI, and the allocation information;
- facilitating, by a programmable device, access to the computer-readable database by an issuer;
- facilitating, by a programmable device, the information concerning the deal event to be displayed with its date in a calendar format;
- displaying, by a programmable device, at least one item of information selected, from the group consisting of information concerning the deal event, the IOI, and the allocation information to the issuer through an electronic communication link.

16. The computer-implemented method of claim 15, wherein the deal event is part of a roadshow.

17. The computer-implemented method of claim 15, wherein the financial issue is selected from the group consisting of equity securities, preferred stock, corporate bonds, and municipal bonds.

18. The computer-implemented method of claim 15, wherein the information concerning the deal event, the IOI, and the allocation information is also displayed to the at least one member of the syndicate.

19. The computer-implemented method of claim 15, further comprising:
- regulating, by a programmable device, access to the computer-readable database by selectively assigning permissions to the issuer.

20. The computer-implemented method of claim 19, wherein regulating the access further comprises checking at least one of the permissions prior to providing the access to the computer-readable database and providing access only as permitted by the checked permissions.

21. The computer-implemented method of claim 20, wherein the issuer is shown some or all from the group consisting of information concerning the deal event, the IOI, and the allocation information based on the permissions.

* * * * *